US012320190B2

(12) United States Patent
Thomson

(10) Patent No.: US 12,320,190 B2
(45) Date of Patent: Jun. 3, 2025

(54) ACCESS OPENING CLOSURE DEVICE

(71) Applicant: Alexander Thomson, Dix Hills, NY (US)

(72) Inventor: Alexander Thomson, Dix Hills, NY (US)

(73) Assignee: Covidien LP, Mansfield, MA (US)

(*) Notice: Subject to any disclaimer, the term of this patent is extended or adjusted under 35 U.S.C. 154(b) by 841 days.

(21) Appl. No.: 17/443,142

(22) Filed: Jul. 21, 2021

(65) Prior Publication Data

US 2023/0023106 A1 Jan. 26, 2023

(51) Int. Cl.

*E06B 7/32* (2006.01)
*A47G 29/14* (2006.01)
*E05B 55/00* (2006.01)
*E05B 59/00* (2006.01)
*E05F 1/16* (2006.01)
*E05G 7/00* (2006.01)

(52) U.S. Cl.

CPC ................ *E06B 7/32* (2013.01); *A47G 29/14* (2013.01); *E05B 55/00* (2013.01); *E05B 59/00* (2013.01); *E05F 1/16* (2013.01); *E05G 7/00* (2013.01); *E05Y 2201/474* (2013.01); *E05Y 2900/131* (2013.01)

(58) Field of Classification Search

CPC .... A47G 29/28; A47G 29/1245; A47G 29/14; E06B 7/32; E05B 17/2003; E05B 17/2084; E05B 17/2088; E05B 65/0017; E05B 55/00; E05B 59/00; E05F 1/16; E05G 7/00; E05Y 2201/474; E05Y 2900/131; E05Y 2800/71

See application file for complete search history.

(56) References Cited

U.S. PATENT DOCUMENTS

| | | | |
|---|---|---|---|
| 85,647 A | 1/1869 | Dolan | |
| 618,314 A | 1/1899 | Albes | |
| 845,964 A | 3/1907 | Mittendorf | |
| 914,528 A | 3/1909 | Thinnes | |
| 952,173 A | 3/1910 | Zitko | |
| 972,948 A | 10/1910 | Urban | |
| 1,239,307 A | 9/1917 | Schmid | |

(Continued)

FOREIGN PATENT DOCUMENTS

GB 2156427 A 10/1985

OTHER PUBLICATIONS

Canadian Office Action dated Oct. 10, 2023, issued in corresponding Canadian Application No. 3,168,122, 7 pages.

(Continued)

*Primary Examiner* — William L Miller
(74) *Attorney, Agent, or Firm* — Carter, DeLuca & Farrell LLP

(57) ABSTRACT

An access opening closure device is provided for enabling passage of food or medication into a confined space without providing direct access from within the confined space to outside of the confined space. The device includes a housing assembly including a body and a cover, and a slide assembly including an access door and a frame. The body defines a receptacle and first and second openings. The housing assembly is pivotally coupled to the slide assembly and is movable from an operative position to a stowed, non-operative position.

15 Claims, 19 Drawing Sheets

(56) References Cited

U.S. PATENT DOCUMENTS

| | | | | | |
|---|---|---|---|---|---|
| 1,840,561 | A | | 1/1932 | Miller | |
| 2,869,780 | A | | 1/1959 | Jensen | |
| 3,110,438 | A | | 11/1963 | Leckner | |
| 3,263,854 | A | | 8/1966 | Powers | |
| 3,709,539 | A | | 1/1973 | Sodenkamp, Jr. | |
| 4,133,996 | A | | 1/1979 | Fread | |
| 4,154,103 | A | | 5/1979 | Fling | |
| 4,190,004 | A | | 2/1980 | Richardson | |
| 4,245,776 | A | | 1/1981 | Miner | |
| 4,418,628 | A | | 12/1983 | Cahill | |
| 4,517,901 | A | | 5/1985 | Clark | |
| 4,571,901 | A | | 2/1986 | Morris et al. | |
| 5,074,606 | A | * | 12/1991 | Priola | E05B 17/2003 292/346 |
| 5,131,189 | A | * | 7/1992 | Mascotte | E05B 17/2003 292/346 |
| 5,205,224 | A | | 4/1993 | Durst | |
| 5,615,624 | A | | 4/1997 | Terry et al. | |
| 5,704,666 | A | * | 1/1998 | Guillemette | E05B 63/242 292/346 |
| 5,799,589 | A | | 9/1998 | Clark | |
| 5,802,991 | A | | 9/1998 | Brown et al. | |
| 5,897,054 | A | | 4/1999 | Firth | |
| 5,921,191 | A | | 7/1999 | Gabel | |
| 5,944,205 | A | | 8/1999 | LaJoie et al. | |
| 6,082,591 | A | | 7/2000 | Healey | |
| 6,126,211 | A | | 10/2000 | Dominquez | |
| 6,302,325 | B1 | | 10/2001 | Alexander | |
| 6,378,769 | B1 | | 4/2002 | Wolgamot | |
| 6,406,076 | B1 | * | 6/2002 | Zarzycki, Jr. | E05B 17/2003 292/346 |
| 6,427,879 | B1 | | 8/2002 | Caldwell | |
| 6,588,655 | B2 | | 7/2003 | Stapleton, Jr. | |
| 6,598,546 | B2 | | 7/2003 | Alexander | |
| 6,607,110 | B2 | | 8/2003 | Nusbaum | |
| 6,651,876 | B2 | | 11/2003 | Scott | |
| 6,817,481 | B2 | | 11/2004 | Alexander | |
| 7,182,243 | B2 | | 2/2007 | Plappert | |
| 7,318,548 | B2 | | 1/2008 | Felice et al. | |
| 9,016,558 | B2 | | 4/2015 | Alexander | |
| 9,963,930 | B1 | * | 5/2018 | Reisender | E06B 7/32 |
| 10,487,571 | B2 | * | 11/2019 | Humma | E05B 65/0864 |
| 2006/0065705 | A1 | * | 3/2006 | Plappert | A47G 29/12 232/19 |
| 2015/0247360 | A1 | * | 9/2015 | Alexander | E06B 7/32 232/43.1 |

OTHER PUBLICATIONS

On The Gate, LLC. (2020). Care &Replacement Parts for the Patented Anti-Splash System. Retrieved May 30, 2023, from https://onthegate.net/about-on-the-gate/.†

* cited by examiner
† cited by third party

FIG. 8
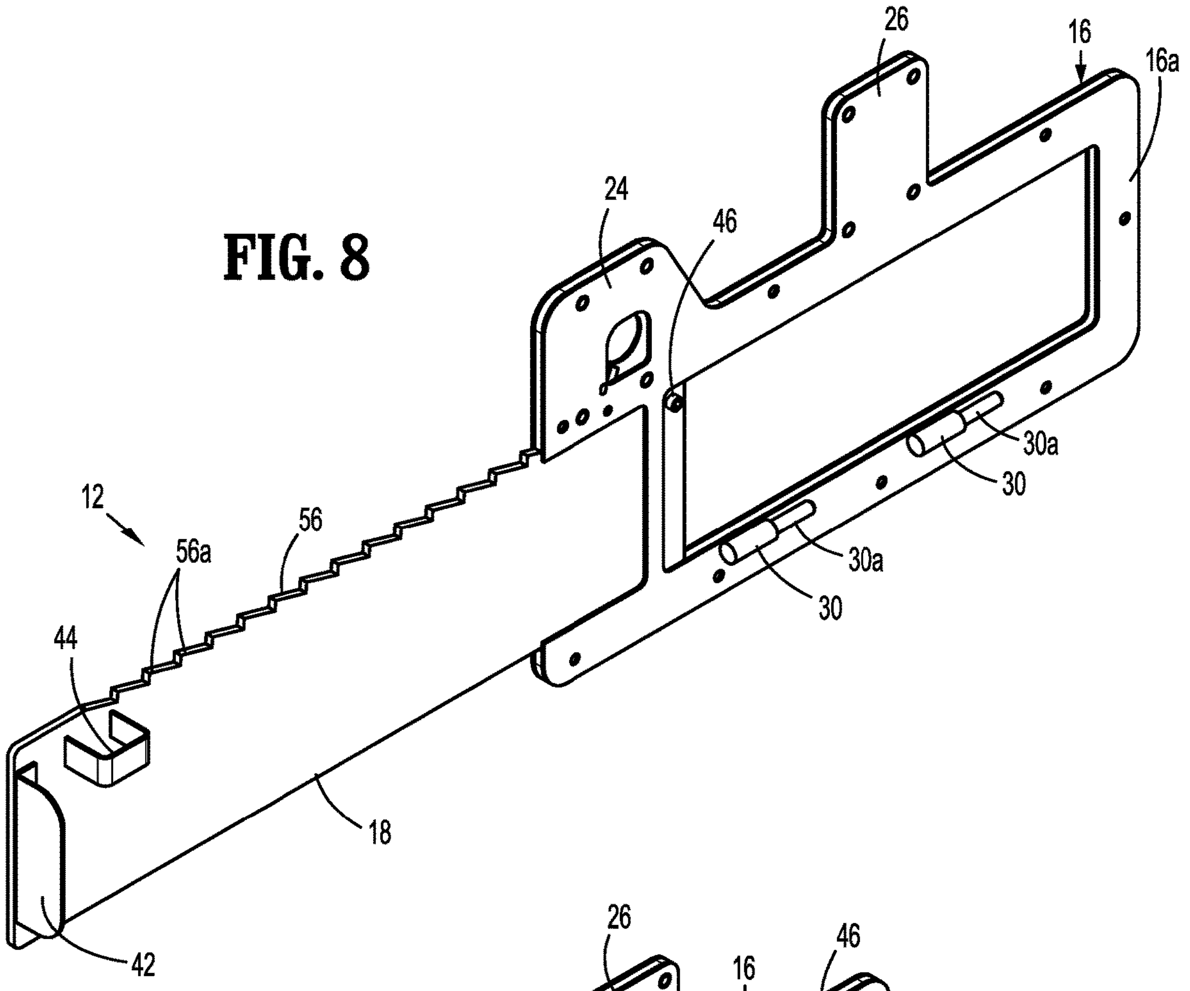
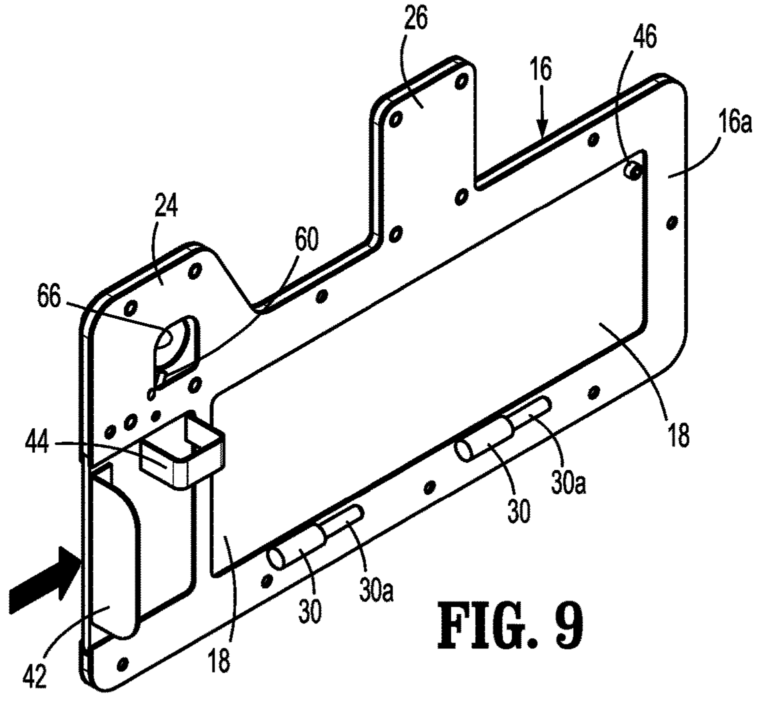
FIG. 9

FIG. 17A
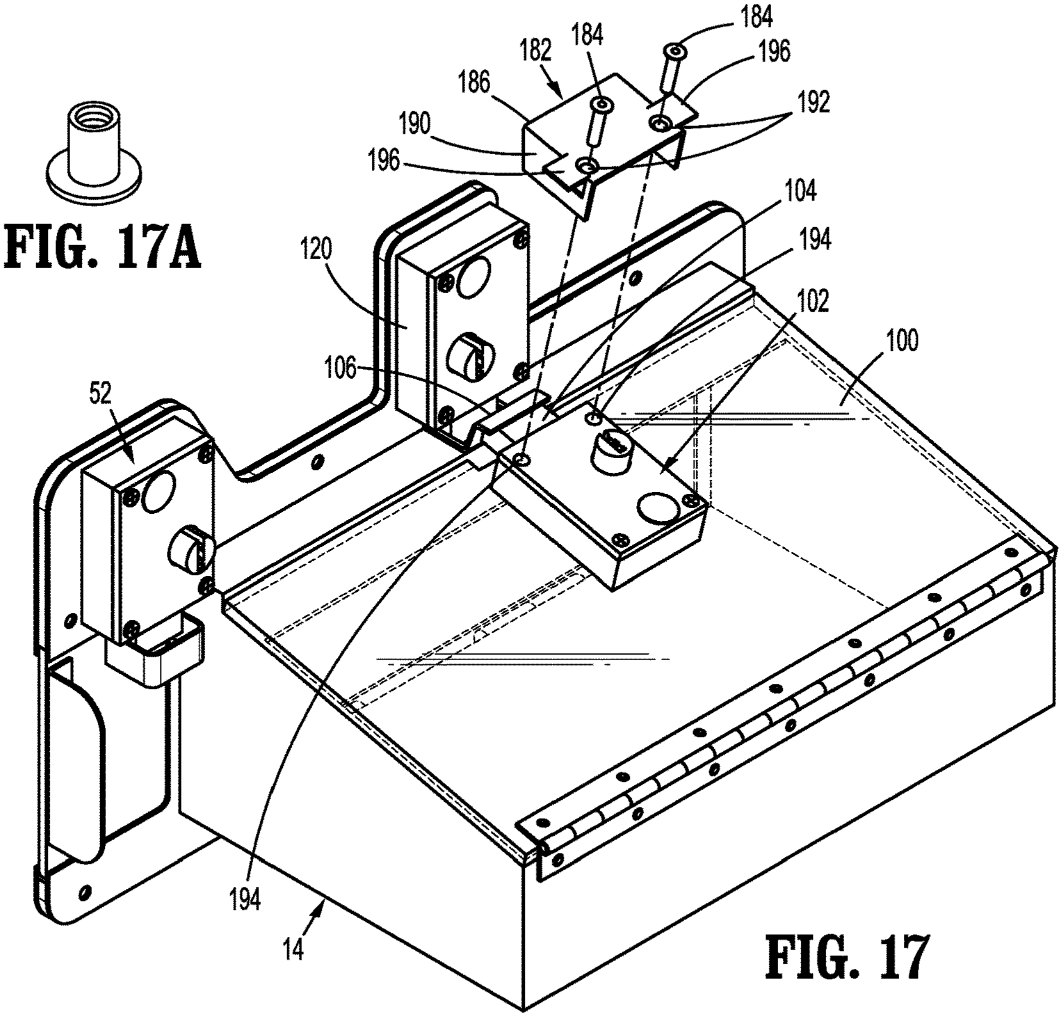
FIG. 17
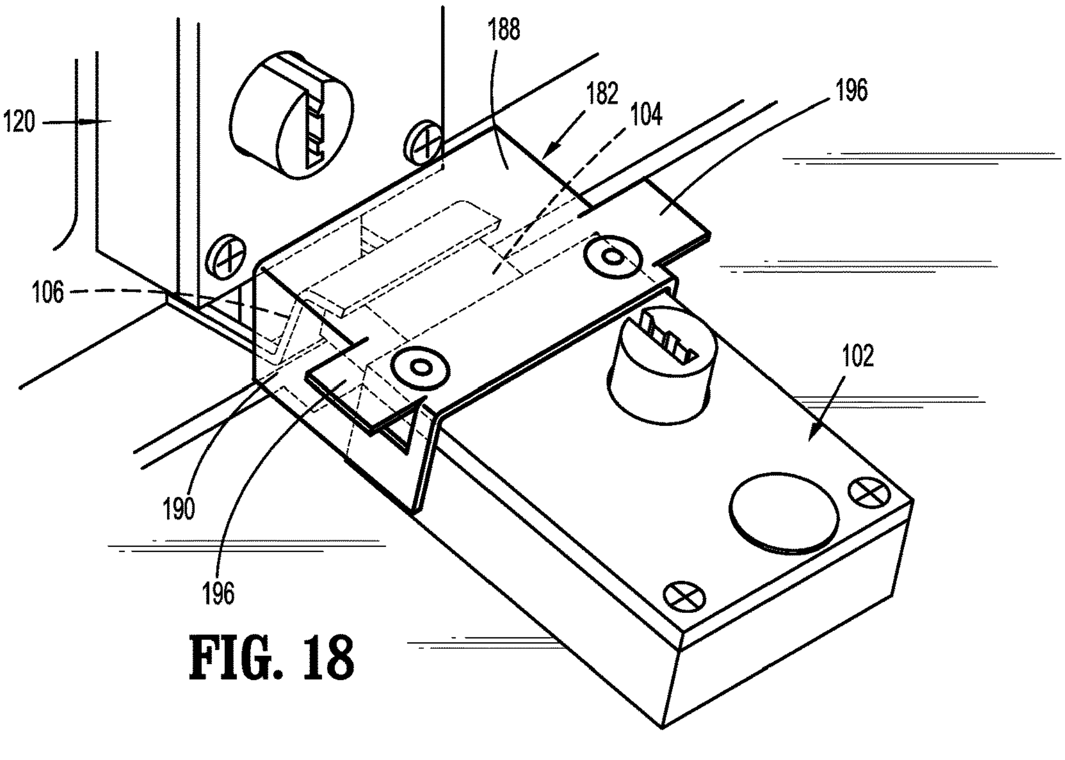
FIG. 18

ACCESS OPENING CLOSURE DEVICE

FIELD

The disclosure relates to an access opening closure device for allowing articles to pass through an otherwise impervious wall. More specifically, the disclosure relates to an access opening closure device for use in prisons and hospital psychiatric wards which allows an article to be passed through a cell or hospital room door without exposing a guard or hospital attendant to possible injury or battery by the prisoner or patient.

BACKGROUND

Access opening closure devices for allowing passage of food or medication through prison cell and hospital room doors without exposing a prison guard or clinician to a person within the cell or room are well known. Such access opening closure devices provide selective access to a prison cell or hospital room through an opening in the prison cell or hospital room door without unlocking and opening the hospital or prison cell door. U.S. Pat. Nos. 6,302,325, 6,598,546, 6,817,481, and 9,016,558 disclose known closure devices and are incorporated herein by reference in their entirety.

Known access closure devices may be subject to tampering by inmates or patients. Such tampering may disable or reduce the effectiveness of the access closure device.

SUMMARY

Aspects of this disclosure are directed to an access opening closure device that includes a housing assembly and a slide assembly. The housing assembly has a body that defines a receptacle, a first opening, a second opening, and a bore. The slide assembly includes a frame and an access door. The frame includes a stabilizing member and defines a frame opening. The access door is supported on the frame and is movable between a closed position covering the frame opening and an open position uncovering the frame opening. The housing assembly is pivotably supported on the frame of the slide assembly between a non-operative position in which the first opening of the body of the housing assembly is pivoted away from the frame opening in the frame of the slide assembly and an operative position in which the first opening of the body of the housing assembly is aligned with the frame opening in the frame of the slide assembly. The stabilizing member of the frame is received within the bore of the housing assembly when the housing assembly is in the operative position.

In aspects of the disclosure, the access opening closure device includes a housing assembly lock that is supported on the frame of the slide assembly and is configured to retain the housing assembly in the operative position and is operable to allow the housing assembly to be pivoted to the non-operative position.

In some aspects of the disclosure, a cover is supported on the body of the housing assembly and is movable from a closed position covering the second opening of the body to an open position uncovering the second opening of the body.

In certain aspects of the disclosure, a cover lock is supported on the cover and is configured to retain the cover in its closed position and operable to facilitate movement of the cover from its closed position to its open position.

In aspects of the disclosure, the cover lock includes a bolt and a strike, and a shroud is secured to the cover to obstruct access to the bolt and the strike.

In some aspects of the disclosure, the shroud includes gripping flanges that facilitate placement of the shroud onto the cover.

In certain aspects of the disclosure, the frame of the slide assembly includes an upper wall, a lower wall, and a vertical strut, and the upper and lower walls each have first and second end portions.

In aspects of the disclosure, the first end portions of the upper and lower walls are coupled together by the vertical strut, and the second end portions of the upper and lower walls are spaced from each other to define an opening that receives the access door when the access door is in its closed position.

In some aspects of the disclosure, first and second stop members are supported on the access door, and the first stop member engages a first side of the vertical strut when the access door is in its open position and the second stop member engages a second side of the vertical strut when the access door is in its closed position.

In certain aspects of the disclosure, the access door of the slide assembly includes first and second vertically oriented cylinders and the frame of the slide assembly includes first and second vertically oriented shafts that support pistons that are received within the first and cylinders such that the access door is movable vertically between its open and closed positions.

In aspects of the disclosure, a biasing member is positioned within each of the first and second cylinders, and each of the biasing members is positioned between the closed end of the respective first or second cylinder and the respective piston to urge the access door towards the open position.

In some aspects of the disclosure, the biasing members include coil springs.

In certain aspects of the disclosure, the access door includes a side wall that has a toothed rack, and the frame of the slide assembly supports an access door lock that is movable from a locked position engaged with the toothed rack to an unlocked position disengaged from the toothed rack.

In aspects of the disclosure, the access door lock includes a pawl member, an actuation knob, and a cam member, and the actuation knob is secured to the cam member and is movable to move the cam member into engagement with the pawl member to move the pawl member from a first position engaged with the toothed rack to a second position disengaged from the toothed rack.

In some aspects of the disclosure, the pawl member is engaged with the toothed rack in the locked position of the access door lock and disengaged from the toothed rack in the unlocked position of the access door lock.

In certain aspects of the disclosure, the access door lock includes a lock member that is movable from a first position engaged with the pawl member to prevent movement of the pawl member from its first position to its second position to a second position spaced from the pawl member to allow movement of the pawl member from its first position to its second position.

In aspects of the disclosure, the slide assembly includes a plunger that is supported on the frame, and the access door defines a plunger opening that is aligned with and receives the plunger when the access door is in the open position to retain the access door in its open position.

Other aspects of the disclosure are directed to an access opening closure device that includes a housing assembly, a cover lock, a shroud, and a slide assembly. The housing assembly has a body that defines a receptacle, a first opening, and a second opening. The cover is supported on the body of the housing assembly and is movable from a closed position covering the second opening of the body to an open position uncovering the second opening of the body. The cover lock is supported on the cover of the housing assembly and includes a bolt and a strike. The cover lock is configured to retain the cover in its closed position and operable to facilitate movement of the cover from its closed position to its open position. The shroud is secured to the cover to obstruct access to the bolt and the strike of the cover lock. The slide assembly includes a frame and an access door. The frame defines a frame opening. The access door is supported on the frame and is movable between a closed position covering the frame opening and an open position uncovering the frame opening. The housing assembly is pivotably supported on the frame of the slide assembly between a non-operative position in which the first opening of the body of the housing assembly is pivoted away from the frame opening in the frame of the slide assembly and an operative position in which the first opening of the body of the housing assembly is aligned with the frame opening in the frame of the slide assembly.

In aspects of the disclosure, the shroud includes gripping flanges that facilitate placement of the shroud onto the cover.

Other aspects of the disclosure are directed to an access opening closure device that includes a housing assembly and a slide assembly. The housing assembly has a body that defines a receptacle, a first opening, and a second opening. The slide assembly includes a frame and an access door. The frame defines a frame opening. The access door is supported on the frame and is movable between a closed position covering the frame opening and an open position uncovering the frame opening. The housing assembly is pivotably supported on the frame of the slide assembly between a non-operative position in which the first opening of the body of the housing assembly is pivoted away from the frame opening in the frame of the slide assembly and an operative position in which the first opening of the body of the housing assembly is aligned with the frame opening in the frame of the slide assembly. The access door of the slide assembly includes first and second vertically oriented cylinders and the frame of the slide assembly includes first and second vertically oriented shafts. Each of the first and second shafts supports a piston that is received within one of the first and cylinders such that the access door is movable vertically between its open and closed positions.

In aspects of the disclosure, a biasing member is positioned within each of the first and second cylinders between the closed end of the respective first or second cylinder and the respective piston to urge the access door towards the open position.

In some aspects of the disclosure, the access door includes a side wall that has a toothed rack and the frame of the slide assembly supports an access door lock that is movable from a locked position engaged with the toothed rack to an unlocked position disengaged from the toothed rack.

Other features of the disclosure will be appreciated from the following description.

BRIEF DESCRIPTION OF THE DRAWINGS

Various aspects of the disclosed access opening closure device are described herein with reference to the drawings, wherein:

FIG. 8 is a side perspective view of the slide assembly of the access opening closure device shown in FIG. 7 with the access door supported on the frame in an open position;

FIG. 9 is a side perspective view of the slide assembly shown in FIG. 8 with the access door supported on the frame in the closed position;

FIG. 17 is a perspective view from above of the disclosed access opening closure device shown in FIG. 1 in its operative position with the access door and cover locked in a closed position and further including a tamper proof lock shroud assembly;

FIG. 17A is a side perspective view of a flange bolt of the tamper proof lock shroud assembly shown in FIG. 17;

FIG. 18 is an enlarged perspective view of the tamper proof lock shroud and cover lock shown in FIG. 17;

DETAILED DESCRIPTION

Figure 1:
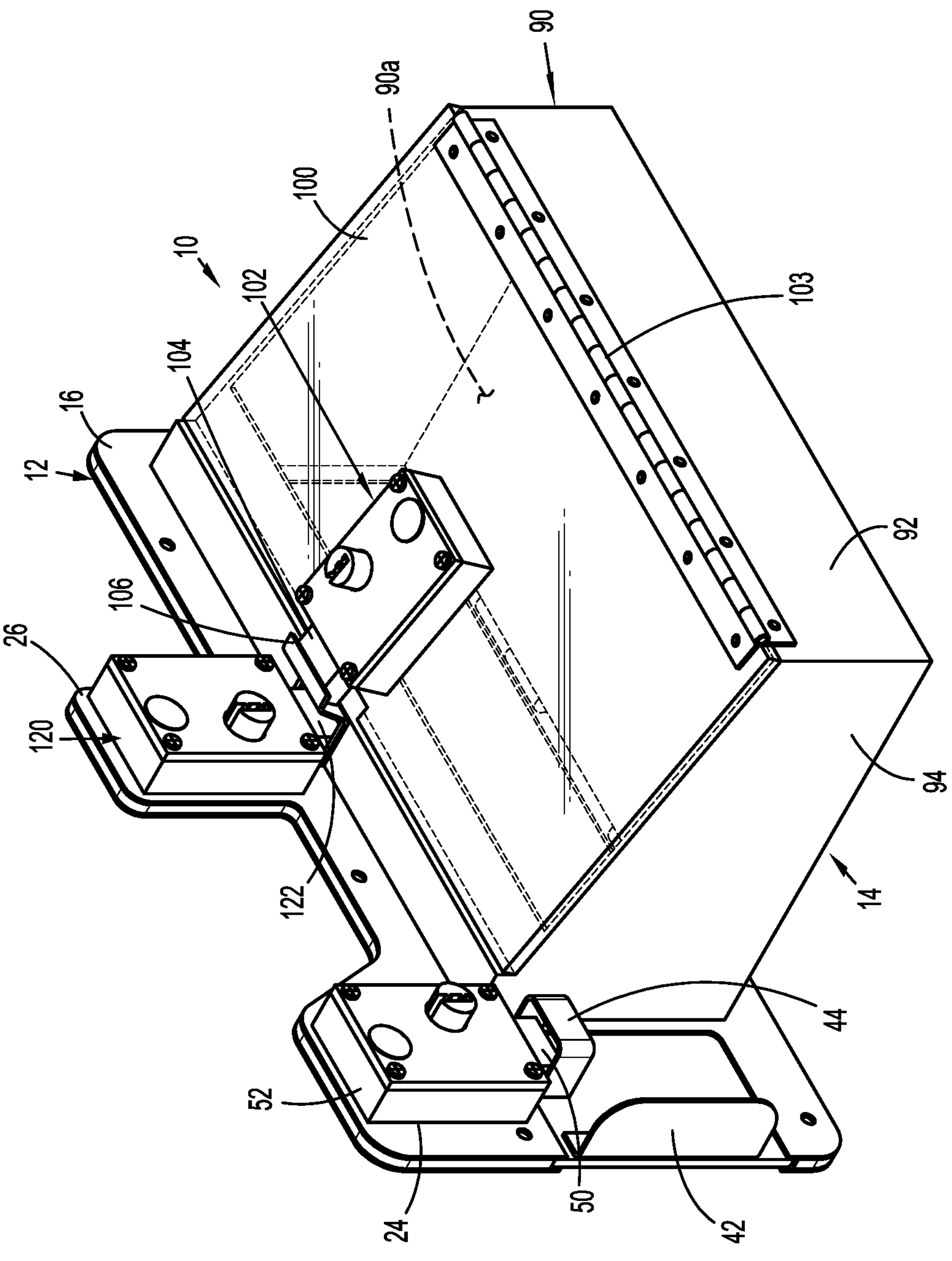
FIG. 1 is a perspective view from above of the disclosed access opening closure device in its operative position with an access door and a cover locked in a closed position.

The disclosed access closure device will now be described in detail with reference to the drawings in which like reference numerals designate identical or corresponding elements in each of the several views. However, it is to be understood that disclosed aspects of the surgical stapling device are merely exemplary of the disclosure and may be embodied in various forms. Well-known functions or constructions are not described in detail to avoid obscuring the disclosure in unnecessary detail. Therefore, specific structural and functional details disclosed herein are not to be interpreted as limiting, but merely as a basis for the claims and as a representative basis for teaching one skilled in the art to variously employ the disclosure in virtually any appropriately detailed structure.

FIGS. 1-9 illustrate the disclosed access opening closure device, shown generally as access opening closure device 10, which includes a slide assembly 12 and a housing assembly 14 that are removably secured together. The slide assembly 12 includes a frame 16 and a slidable access door 18. The frame 16 defines a channel **16*a* (FIG. 6) for slidably receiving the access door 18. The frame 16 also defines an opening 20 (FIG. 5) which is covered by the access door 18 when the access door 18 is in a closed position (FIG. 9) and uncovered by the access door 18 when the access door 18 is moved to an open position (FIG. 8). In aspects of the disclosure, the frame 16 includes a pair of plates 23 which are separated by spacers 23*a* (FIG. 6) to define the channel 16*a* along which the access door 18** is slidable between the open and closed positions. Alternately, other frame constructions are envisioned.

FIGS. 2, 3, and 5-9 illustrate the frame 16 of the slide assembly 12 which includes a first lock mounting portion 24, a second lock mounting portion 26, a vertical strut 28, and a pair of hinge members 30. The frame 16 also defines a plurality of through bores 34 to facilitate securement of slide assembly 12 about the opening of a support structure such as a prison cell door, hospital door or the like, using bolts (not shown). A plurality of through bores 32 are also provided on the first and second lock mounting portions 24 and 26 to facilitate securement of locks to the frame 16. The through bores 32 and/or 34 may be threaded or include a threaded insert to improve securement of the slide assembly 12 to the support structure or to facilitate securement of a lock to the frame 16.

FIGS. 1-9 illustrate the access door 18 of the slide assembly 12 which includes a handle 42, a catch or strike 44, and a stop member 46. The handle 42 is secured to a first end of access door 18 and provides a gripping surface to facilitate movement of the access door 18 between the open and closed positions. The strike 44 is positioned beneath the first lock mounting portion 24 when the access door 18 is in the closed position (FIG. 1) and is positioned to receive the bolt 50 of an access door lock 52 (FIGS. 10-11) to lock the access door 18 in the closed position. The stop member 46, which may be a screw which is threaded to access door 18, is secured to the access door 18 within the opening 20 and defines a projection. The screw 46 defines the open and closed positions of the access door 18 of the slide assembly 12 and is positioned to engage the vertical strut 28 of the frame 16 of the slide assembly 12 when the access door 18 is in the open position (FIG. 8) and is positioned to engage the end **16*a* of the frame 16 opposite the vertical strut 28 when the access door 18 is in the closed position (FIG. 9**).

Figure 10:
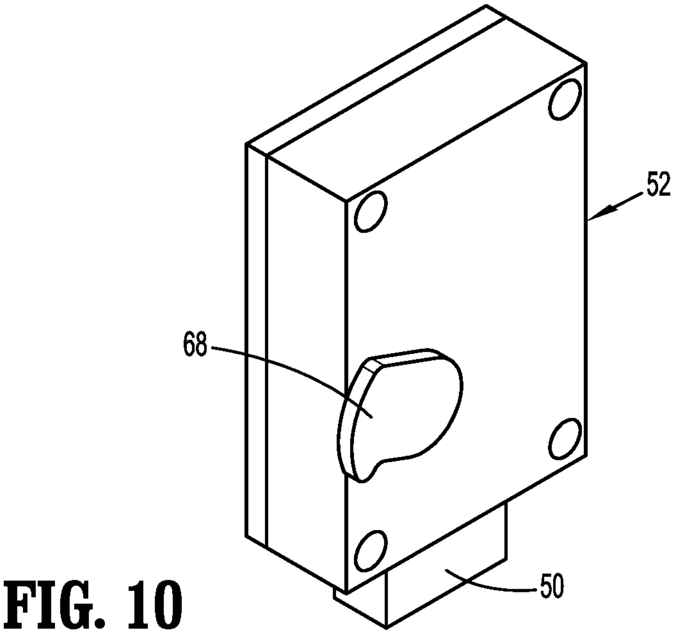
FIG. 10 is a side perspective view of a lock for locking the access door of the access opening closure device shown in FIG. 1.
Figure 11:
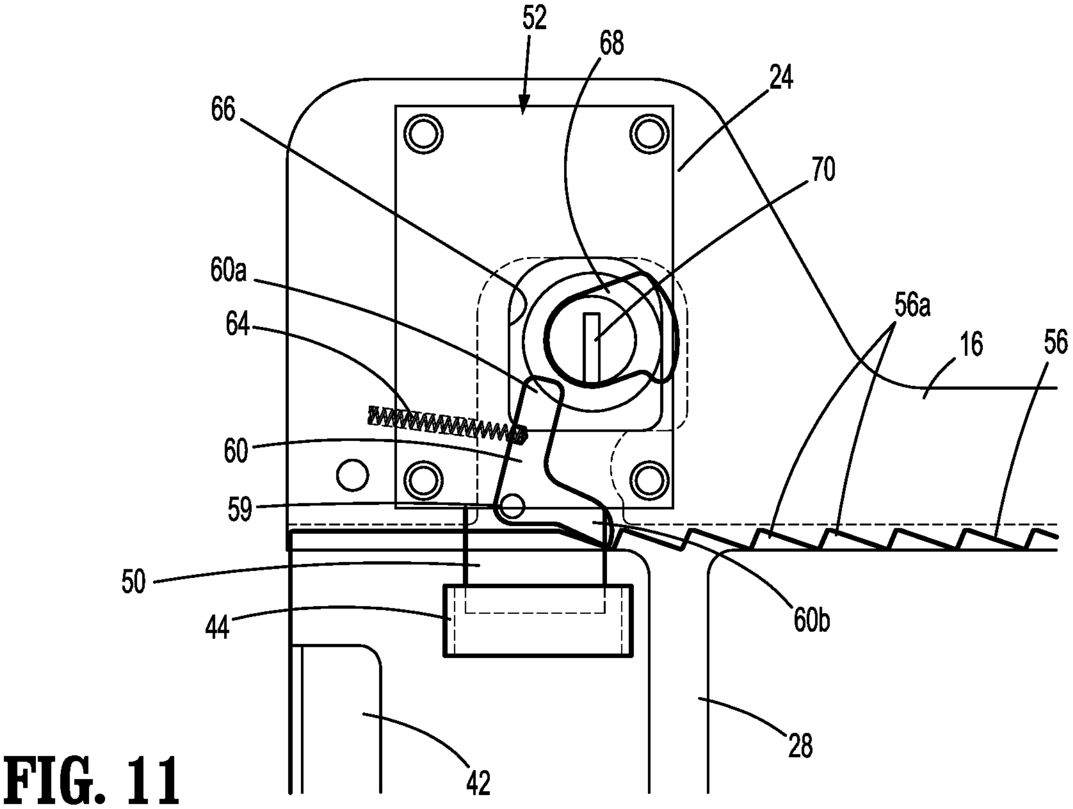
FIG. 11 is a front view, partially in phantom, of the lock shown in FIG. 10 mounted to the frame of the slide assembly shown in FIG. 2 in the locked position.
Figure 12:
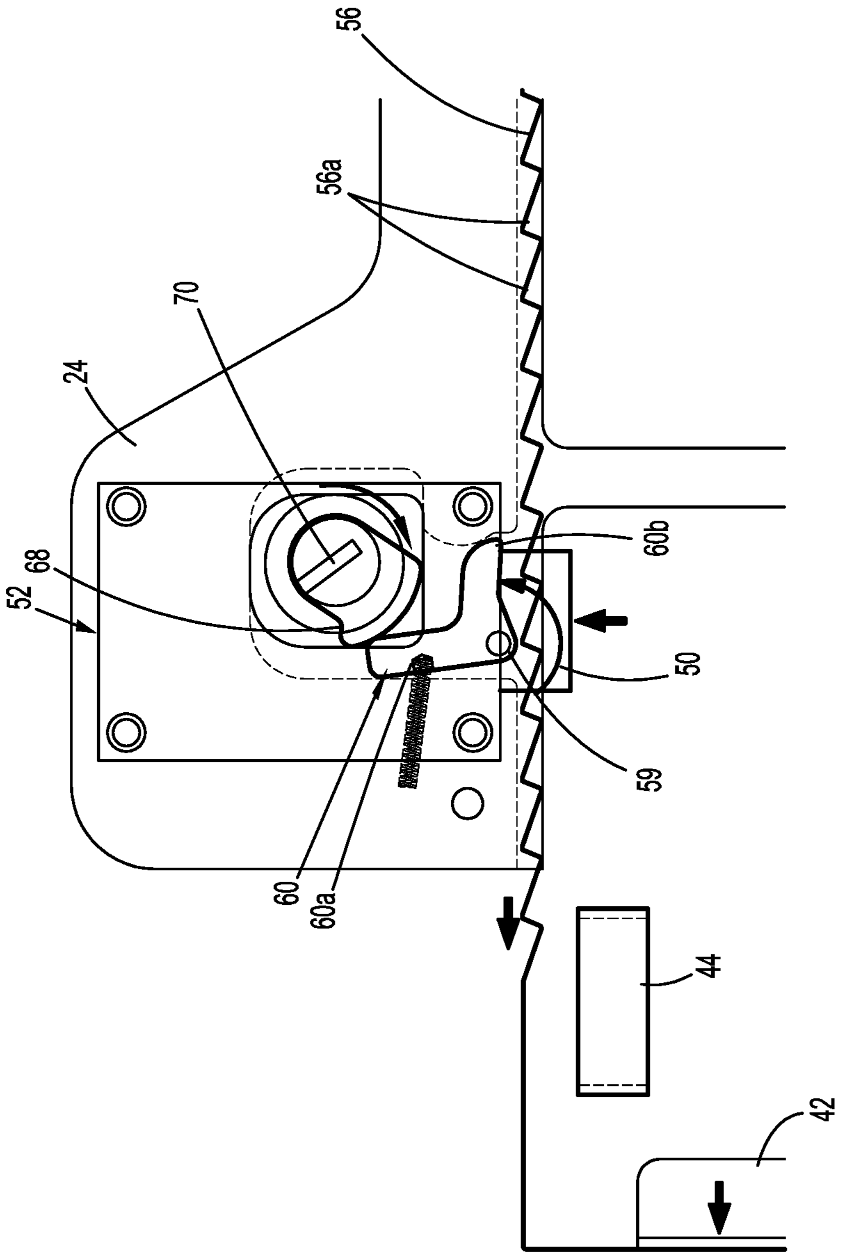
FIG. 12 is a front view, partially in phantom, of the lock shown in FIG. 10 mounted to the frame of the slide assembly shown in FIG. 2 in the unlocked position.

FIGS. 10-12 illustrate the access door 18 which includes a top wall that defines a toothed rack 56 having a plurality of teeth **56*a* (FIG. 2B). Each tooth 56*a* has a triangular shape with a substantially vertical wall and a sloped wall. The vertical wall of each tooth 56*a* prevents movement of the access door 18 towards the open position, whereas the sloped wall of each tooth 56*a* facilitates movement of the access door 18 towards the closed position. A ratchet member 60 is supported adjacent the first lock mounting portion 24 on the frame 16 of the slide assembly 12 and is biased into contact with the teeth 56*a* of rack 56. The ratchet member 60 is pivotally supported within the frame 16 about a pivot member 59 and includes an L-shaped body having a vertical leg 60*a* and a horizontal leg 60*b*. In aspects of the disclosure, the ratchet member 60 is biased into contact with the rack 56 by a biasing member, e.g., spring 64, which urges a pin or rod (not shown) into contact with vertical leg 60*a* of ratchet member 60**. Alternately, the use of other biasing members or assemblies is envisioned.

The vertical leg **60*a* of the ratchet member 60 extends into an opening 66 defined in the first lock mounting portion 24. When the access door lock 52 is supported on the first lock mounting portion 24, a cam member 68 of the access door lock 52 is positioned within the opening 66 such that when a key (not shown) is inserted into a key slot 70 (FIGS. 11 and 12) of the access door lock 52 and turned to lift the bolt 50 from strike 44, the cam member 68 is rotated into engagement with the vertical leg 60*a* of the ratchet member 60 (FIG. 12) to disengage the horizontal leg 60*b* of the ratchet member 60 from engagement with the rack 56. This allows the access door 18 to be freely moved between the opened and closed positions. In aspects of the disclosure, the access door lock 52 is rotatable between three positions. In the first position, the lock bolt 50 is engaged with the strike 44 and the ratchet member 60 is engaged with the rack 56. In the second position, the lock bolt 50 is disengaged with the strike 44 and the ratchet member 60 remains engaged with rack 56. In the third position, the lock bolt 50 is disengaged from the strike 44 and the ratchet member 60 is disengaged from the rack 56. In the first position, the access door 18 is locked in the closed position. In the second position, the access door 18, if not already in the closed position, is only movable towards the closed position. Finally, in the third position, the access door 18** may be moved freely between the open and closed positions.

Figure 2:
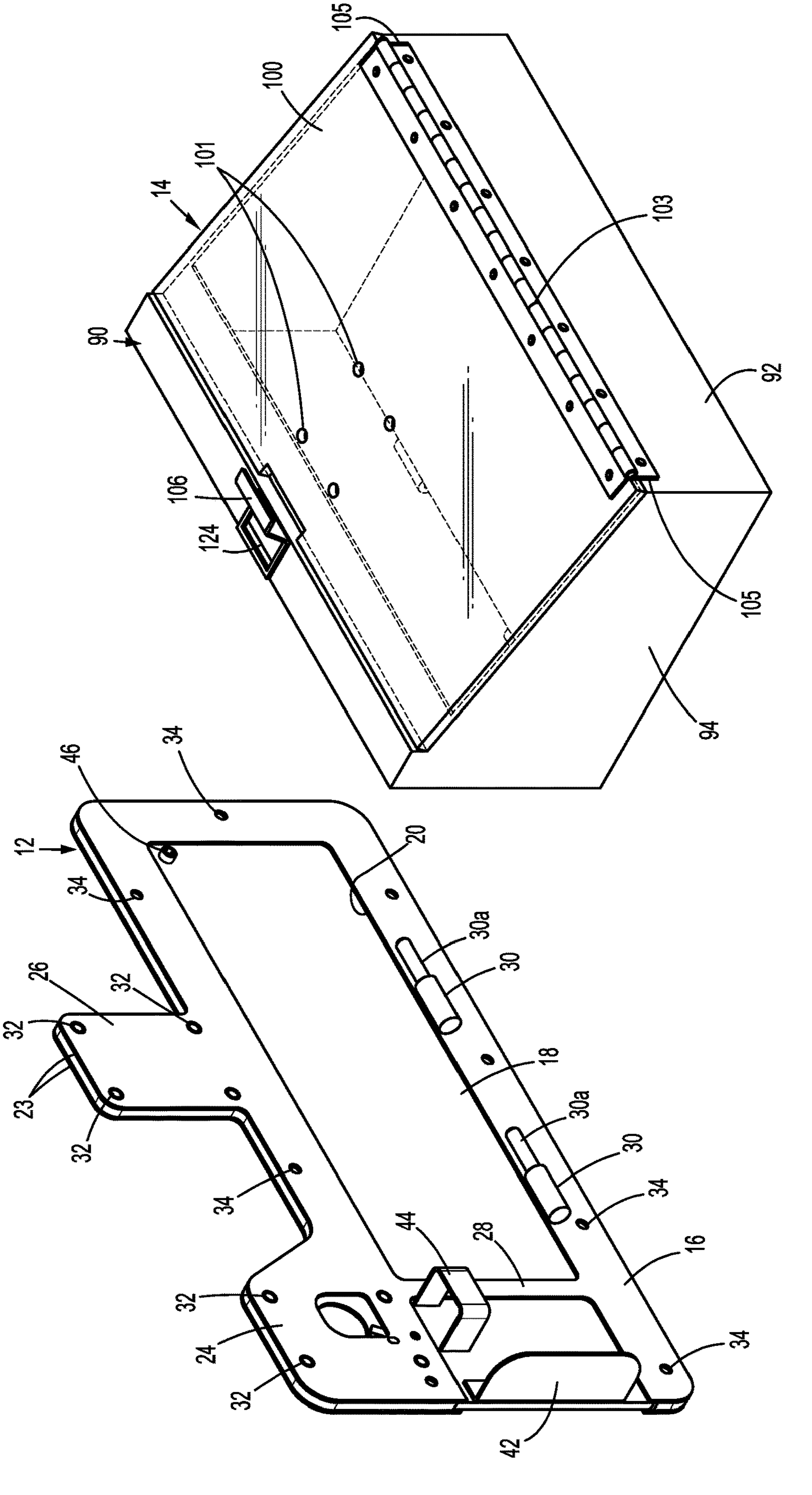
FIG. 2 is a perspective view from above of the access opening closure device shown in FIG. 1 with a slide assembly separated from a housing assembly.
Figure 3:
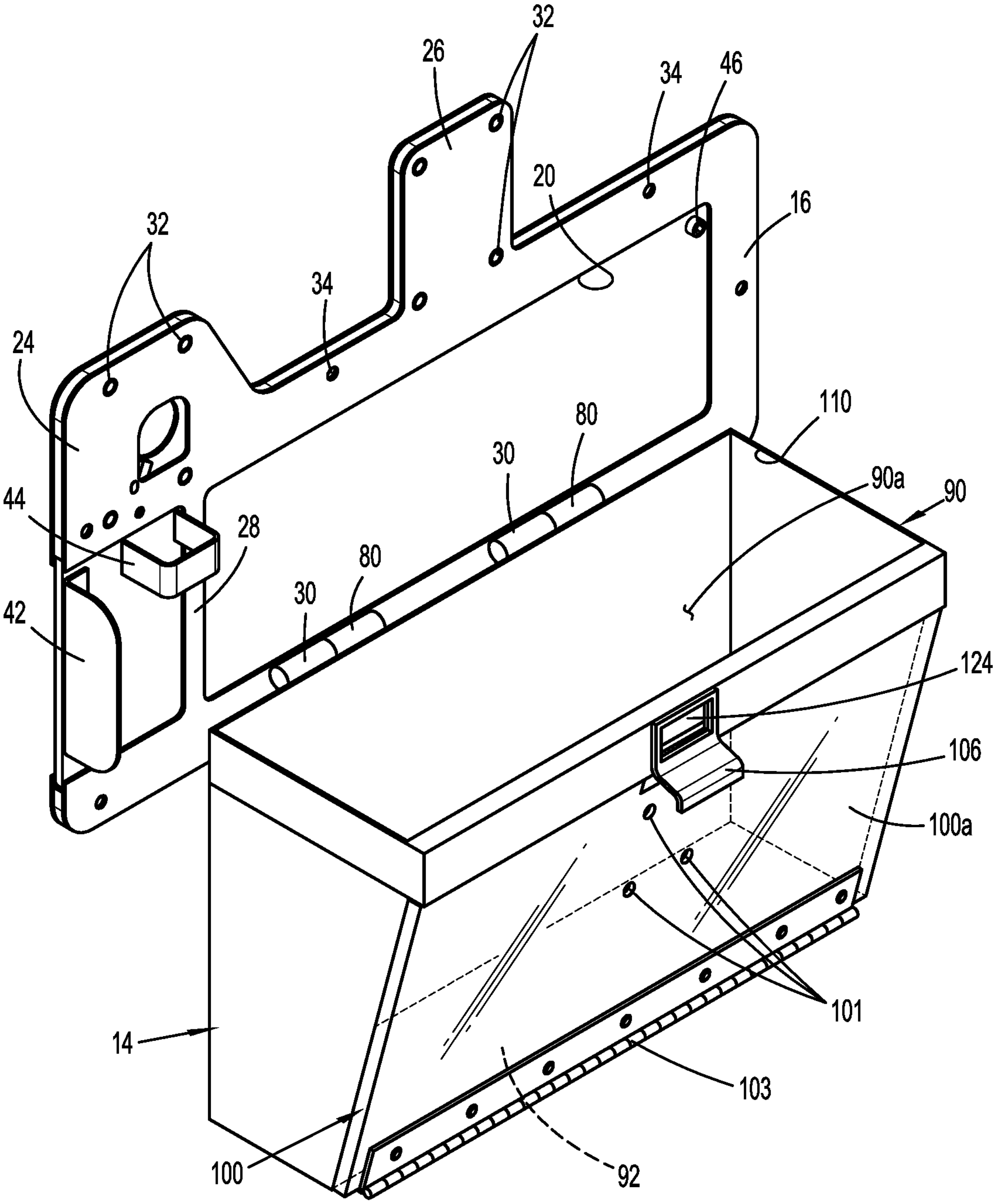
FIG. 3 is a front, perspective view of the access opening closure device shown in FIG. 1 in a stowed position with the housing assembly pivotally secured to a frame of a slide assembly.

FIGS. 2 and 3 illustrate the frame 16 of slide assembly 12 which includes structure for pivotally attaching the slide assembly 12 to the housing assembly 14. In aspects of the disclosure, the hinge members 30 are supported below the opening 20 on frame 16 of the slide assembly 12. The hinge members 30 include cylindrical posts 30*a* (FIG. 2) that are dimensioned to be slidably received in cylindrical bearings or hinge members 80 (FIG. 4) supported on a bottom surface of housing assembly 14 to pivotally secure housing assembly 14 to the frame 16 of the slide assembly 12. Although not shown, the cylindrical posts 30*a* may define threaded bores which receive bolts to prevent removal of the bearings 80 from the hinge members 30 and, thus, prevent removal of the housing assembly 14 from the slide assembly 12. As shown in FIG. 3, the slide assembly 12 is pivotal from an operative position FIG. 1 to a stowed or non-operative position as described in further detail below.

Figure 4:
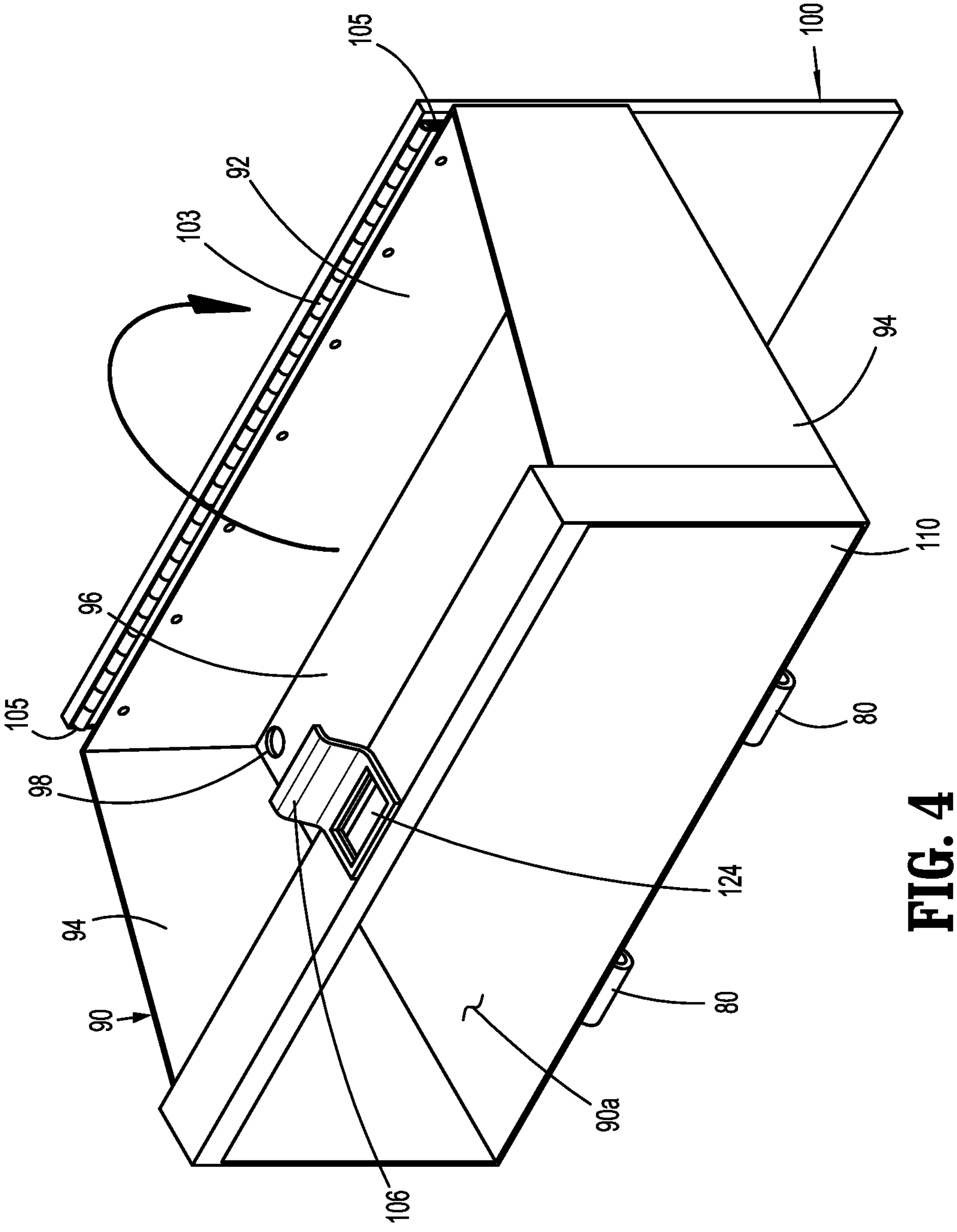
FIG. 4 is a side perspective view from the rear end of the housing assembly of the access opening closure device shown in FIG. 1 with the cover in the open position.
Figure 6:
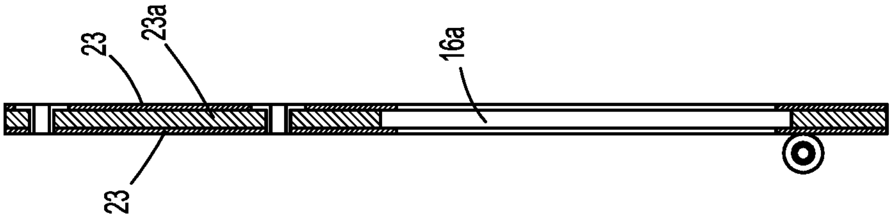
FIG. 6 is a cross-sectional view taken along section line 6-6 of FIG. 5.
Figure 5:
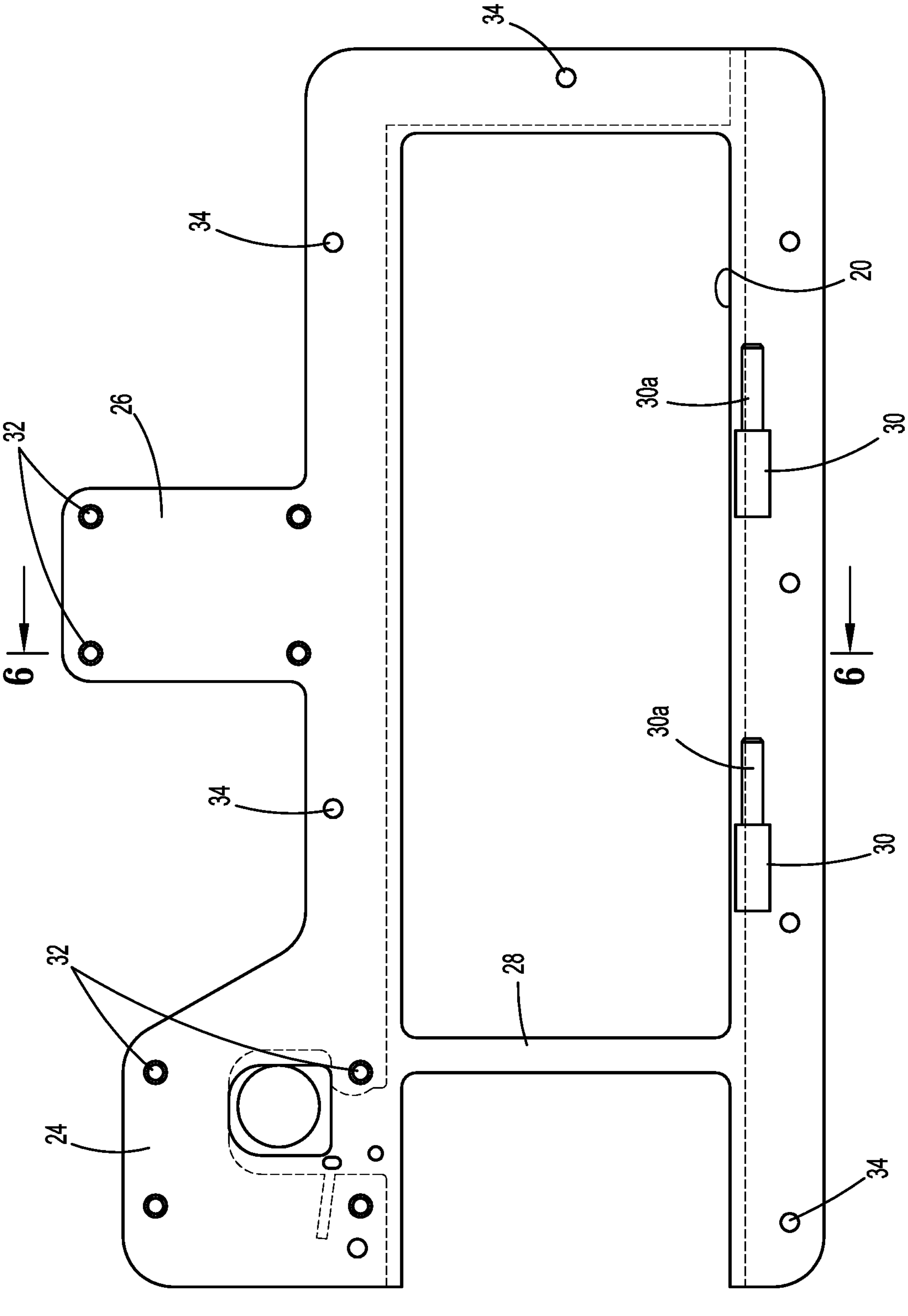
FIG. 5 is a front view of the frame of the slide assembly of the access opening closure device shown in FIG. 1.
Figure 7:
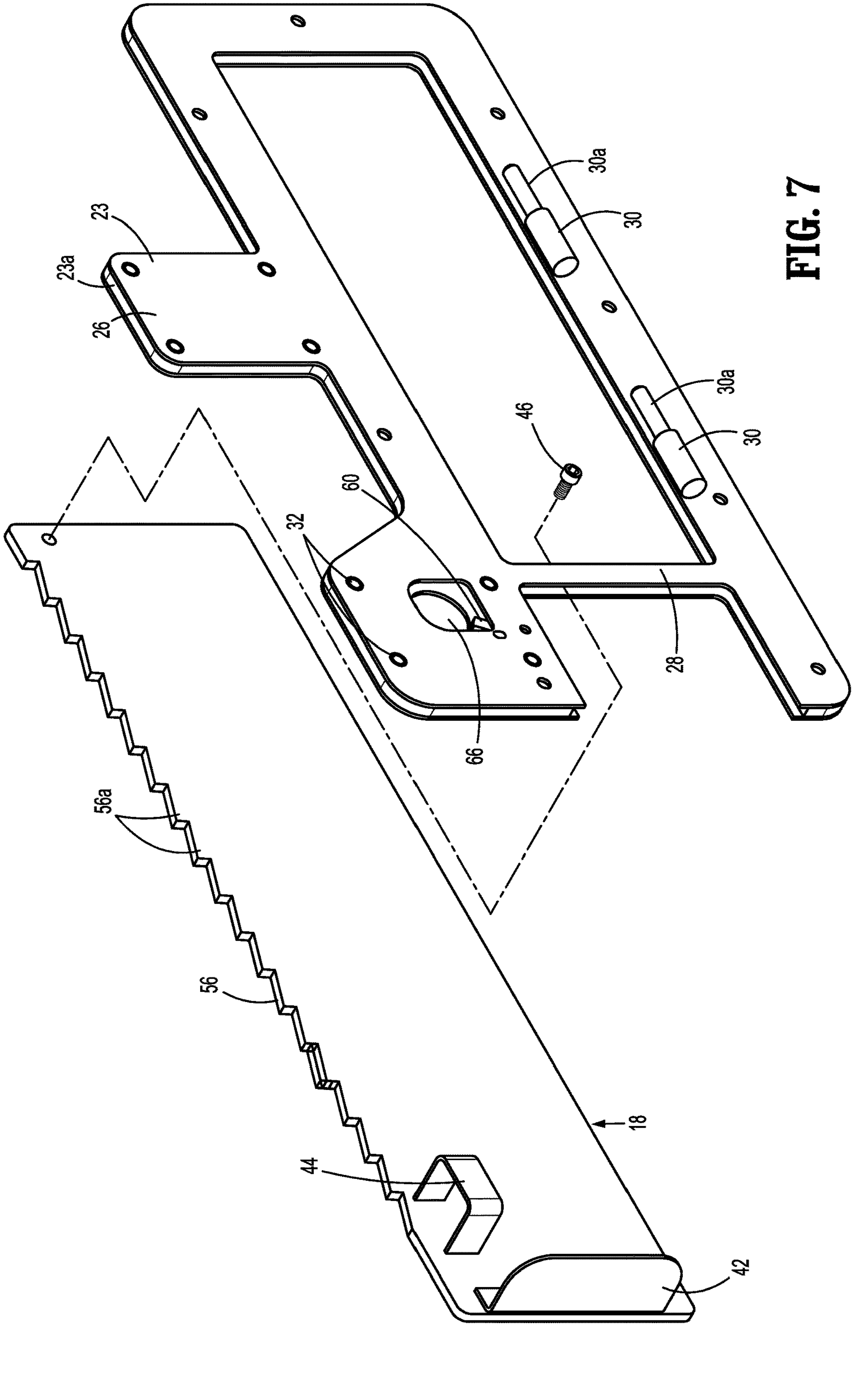
FIG. 7 is a perspective view of the slide assembly of the access opening closure device shown in FIG. 2 with the access door separated from the frame.

FIGS. 2-4 illustrate the housing assembly 14 which includes a body 90 that defines a receptacle 90*a*. Although the body 90 of the housing assembly 14 is illustrated as being substantially rectangular, other body configurations are envisioned. In aspects of the disclosure, the body 90 of the housing assembly 14 includes a front wall 92, a pair of side walls 94, and a bottom wall 96. The bottom wall 96 may include one or more drain openings 98 (FIG. 4) to facilitate drainage of fluid from within the receptacle 90*a* of the housing assembly 14 which may spill into receptacle 90*a*. A cover 100 is movably secured to the body 90 of the housing assembly 14 to enclose the receptacle 90*a* in a closed position (FIG. 1) and provide access to the receptacle 90*a* in an open position (FIG. 4). Although body 90 of housing assembly 14 is illustrated as having an open top which is enclosed by a movable cover 100, it is envisioned that the top surface of body 90 may be enclosed by a fixed wall and that one of the side walls 94 or front wall 92 may be replaced with a removable cover. In aspects of the disclosure, the cover 100 is formed from a substantially transparent material such as Lexan®. Alternately, other materials of construction are envisioned.

The cover 100 is connected by a hinge 103 (FIG. 4) to a top edge of front wall 92 of body 90 of the housing assembly 14. Alternatively, the cover 100 can be movably mounted to the body 90 in a variety of different ways including by slidably mounting the cover 100 to body 90. In aspects of the disclosure, the cover 100 may be urged by a spring member 105 to an open position. The spring member 105 may be incorporated into the hinge 103. Although the hinge 103 is shown to be positioned on the top edge of the front wall 92, the cover 100 may be hinged to the top edge 107 on a rear end of body 18 or to a top edge of either of sidewalls 94.

FIGS. 1 and 3 illustrate the cover 100 which includes a top surface 100*a* and defines a series of openings 101 (FIG. 3). The openings 101 may be threaded to facilitate securement of a cover lock 102 (FIG. 1) to cover 100 (FIG. 8). The cover lock 102 is like the access door lock 52 and includes a bolt 104 which is movable to engage a strike 106 supported on the body 90 of the housing assembly 14 to lock the cover 100 in the closed position.

Figure 14:
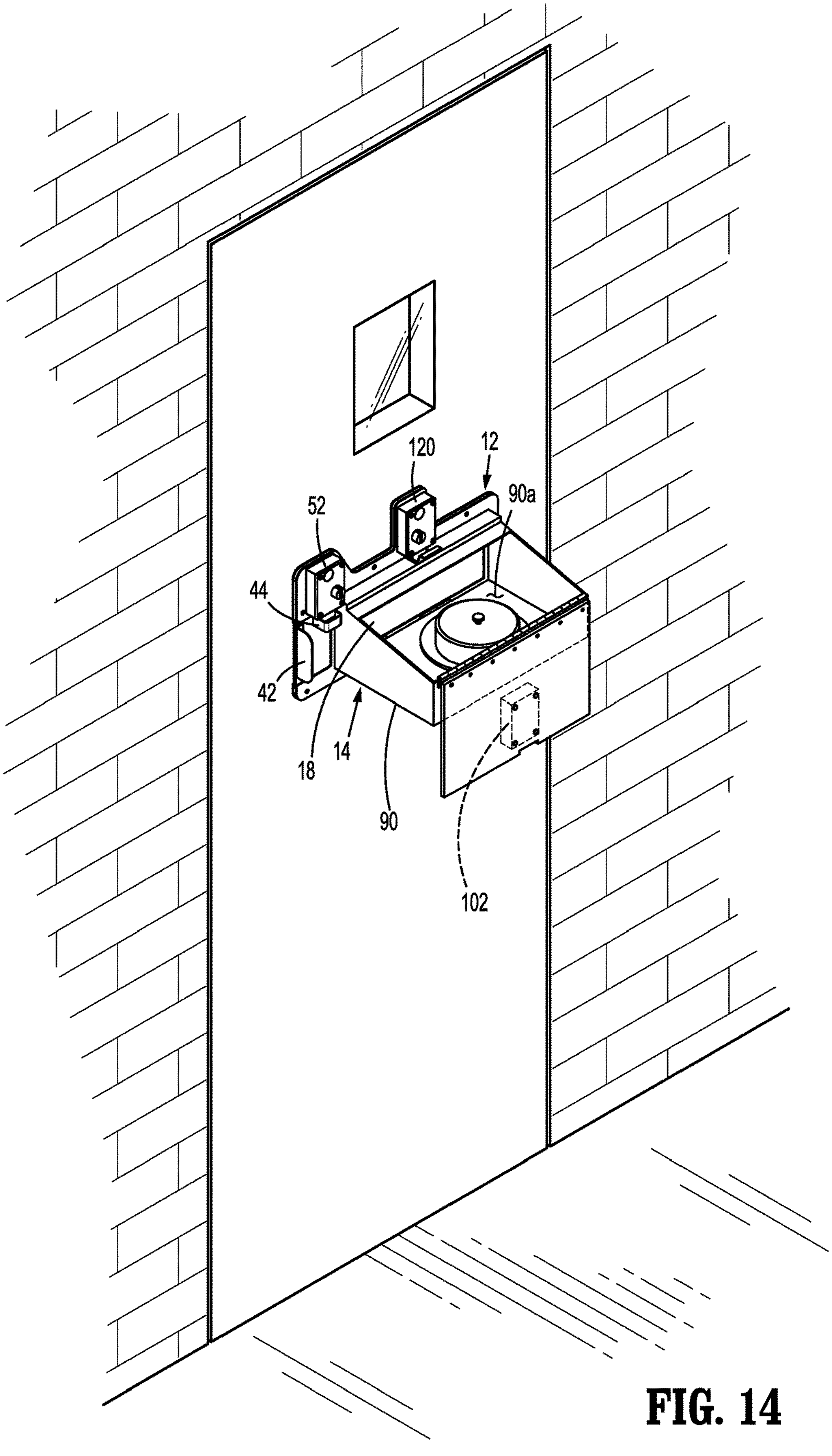
FIG. 14 is a perspective view from the front of the access opening closure device shown in FIG. 1 supported on a door with the cover in an open position and the access door in the closed position.
Figure 15:
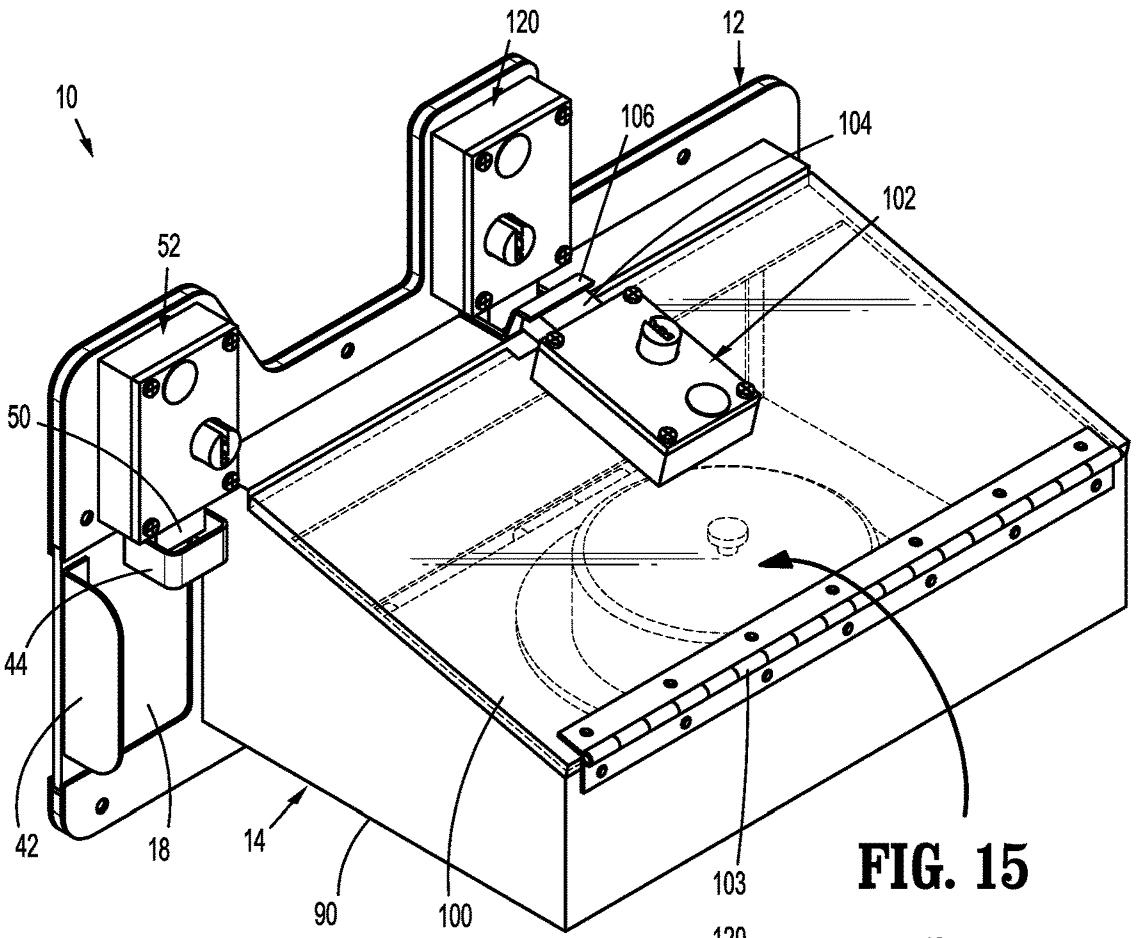
FIG. 15 is a perspective view from the front of the access opening closure device shown in FIG. 1 with the access door and the cover in the closed position.
Figure 16:
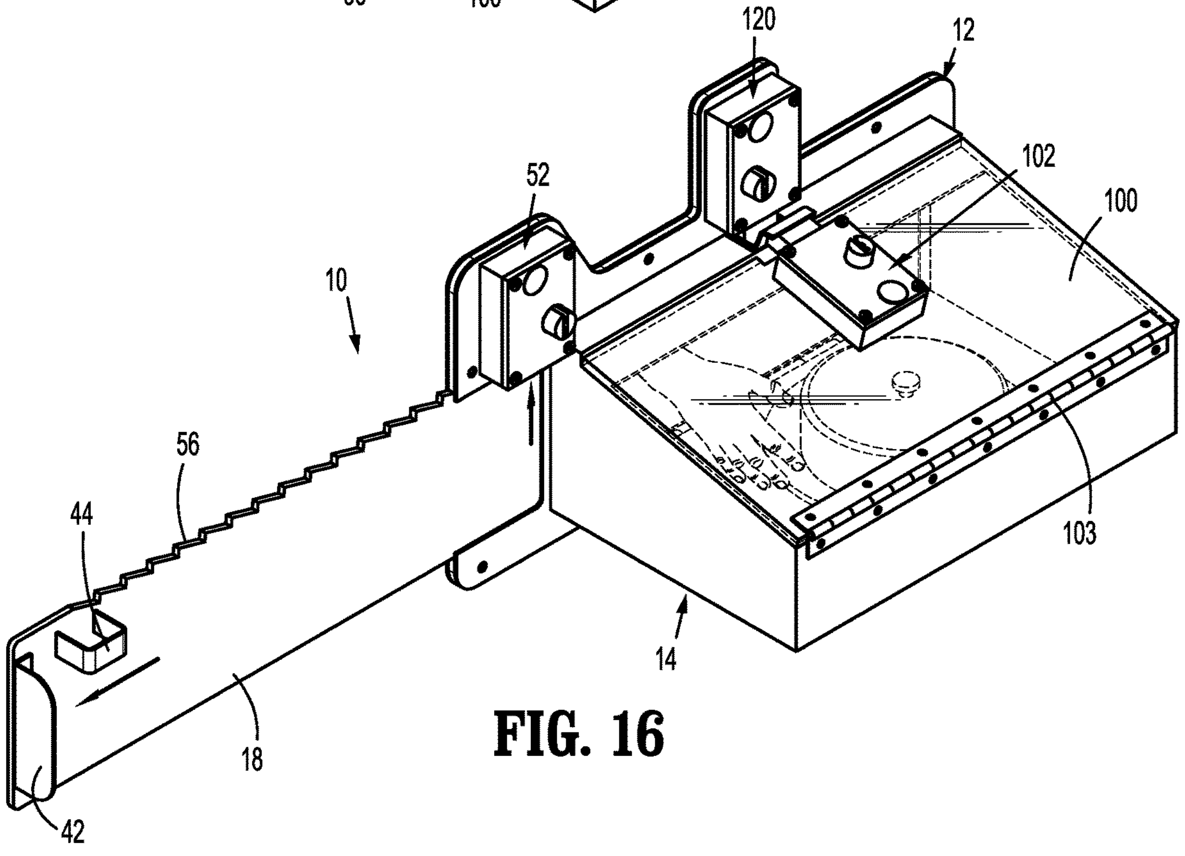
FIG. 16 is a perspective view from the front of the access opening closure device shown in FIG. 1 with the access door of the slide assembly in the open position and the cover in the closed position.

FIGS. 3 and 4 illustrate the body 90 of the housing assembly 14 which defines a rear opening 110 that is positioned opposite to the front wall 92 of the body 90 of the housing assembly 14 above the cylindrical bearings 80. The housing assembly 14 is mountable to the slide assembly 12 by slidably positioning the cylindrical bearings 80 on the cylindrical posts 30*a* of the hinge members 30 (FIG. 3). The housing assembly 14 is pivotable in relation to the frame 16 of the slide assembly 12 from a first stowed or non-operative position to an operative position. In the stowed position shown in FIG. 3, the housing assembly 14 is positioned beneath the opening 20 of frame 16. In the operative position shown in FIG. 1, the rear opening 110 of housing assembly 14 is positioned in communication with opening 20 of frame 16 and the access door 18 can be moved from the closed position shown in FIG. 16 to the open position shown in FIG. 14 to provide access to the receptacle 90*a* of housing assembly 14.

Figure 13:
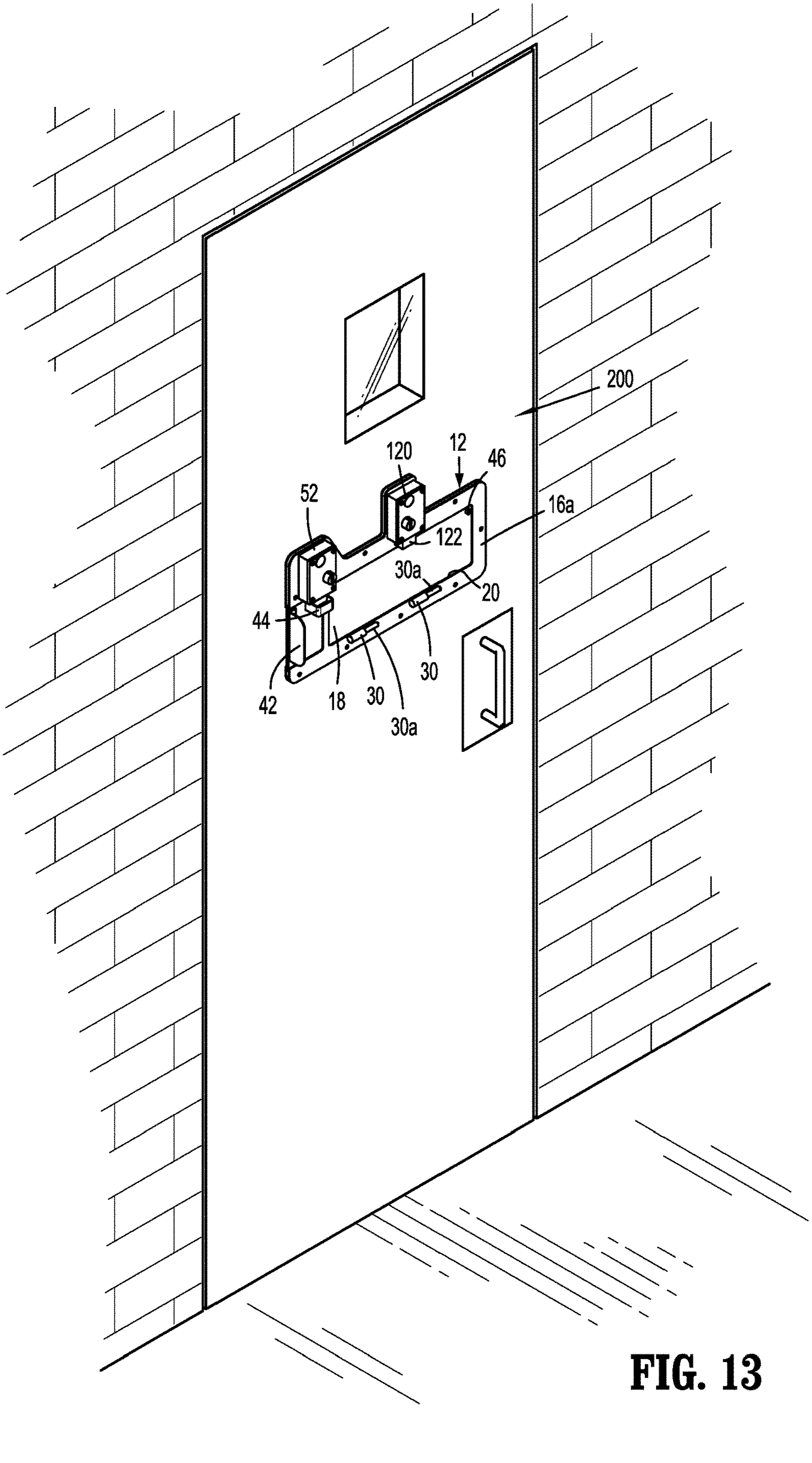
FIG. 13 is a perspective view from the front of the slide assembly secured to a door with the access door in the closed position.

To retain the housing assembly 14 in the operative position, a housing assembly lock 120 is mounted on the second lock mounting portion 26 of the frame 16. The housing assembly lock 120 includes a bolt 122 (FIG. 13) which is received in a recess 124 (FIG. 2) formed in an upper side of the body 90 of the housing assembly 14 to prevent housing assembly 14 from pivoting about hinge members 30 from the operative position to the stowed position. To position the housing assembly 14 in the stowed position, the housing assembly lock 120 can be operated with a key (not shown) to lift the bolt 122 from within the recess 124 of body 90 of the housing assembly 14. When this occurs, gravity will cause the housing assembly 14 to pivot about hinge members 30 to the lowered position. To prevent slamming, the pivoting movement of housing assembly 14 can be controlled by grasping the body 90 of the housing assembly 14.

FIGS. 13-16 illustrate use of the access opening closure device 10. To use the access opening closure device 10, the slide assembly 12 is secured to a support structure 200 such as a hospital or prison door using bolts or the like such that the opening 20 in the frame 16 of the slide assembly 12 is aligned with an opening (not shown) formed in the support structure 200. Thereafter, the access door lock 52 can be operated with a key to allow the access door 18 to be selectively moved between the open and closed positions to allow selective access to the opening in the support structure 200. The slide assembly 12 is usable independently of the housing assembly 14 to allow or prevent access through the opening in the support structure 200. More specifically, if it is desired to limit direct access through the opening in the support structure 200 to the outside world, the housing assembly 14 can be pivotably secured to the slide assembly 12 by positioning the cylindrical bearings 80 of body 90 of housing assembly 14 about hinge members 30. Thereafter, the housing assembly 14 can be pivoted to the operative position. The housing assembly lock 120 can be operated with a key (not shown) to retain the housing assembly 14 in the operative position. In the operative position, the cover lock 102 can be operated with a key (not shown) to facilitate movement of the cover 102 from the closed position to the open position (FIG. 14) and provide access to the receptacle 90*a* of the housing 90 while the access door 18 of the slide assembly 12 is closed. Thereafter, the cover 100 can be moved to the closed position to cover receptacle 90*a* and the access door 18 can be opened to provide access to the receptacle 90*a* through the opening in the support structure and the opening 110 in body 90 of the housing assembly 14. See FIG. 16. At any time, if housing assembly 14 is not required, the housing assembly lock 120 can be actuated with a key to allow housing assembly 14 to be pivoted to the stowed (FIG. 3).

Although not shown, the key operated locks 52, 102 and 120 may have spring-loaded bolts such that the bolts may be key operated to open the locks but will automatically return to their locked positions engaged with their respective strikes. In addition, it is noted that only key operated locks are specifically disclosed in this application to control operation of the access door 18, the cover 100 and the pivotally mounted housing assembly 14. However, it is envisioned that one or more of the access door 18, cover 100 and housing 14 can be retained in the locked position by other non-key operated locking or latching devices. It is also envisioned that the cover 100 can be formed as a single member or a plurality of members.

FIGS. 17 and 18 illustrate the access opening closure device 10 (FIG. 1) with a tamper-proof lock shroud assembly, shown generally as shroud assembly 180, secured to the cover 100. The shroud assembly 180 includes a shroud 182 and screws 184. The shroud 182 is positioned over the bolt 104 and the strike 106 of the cover lock 102. In aspects of the disclosure, the shroud 182 includes a body 186 that has a top wall 188 and side walls 190. The top wall 188 defines openings 192 and is received atop the cover lock 102 to cover the bolt 104 and the strike 106 of the cover lock 102. The openings 192 receive the screws 184 which extend through openings 194 in the cover lock 102 and the openings 101 (FIG. 2) in the cover 100 to secure the shroud 182 to the cover lock 102 and the cover 100. In aspects of the disclosure, the screws 184 include flange nuts (FIG. 17A) although other types of fastening devices could be used to secure the shroud 182 to the cover lock 100. When the shroud 182 is secured to the cover lock 102, the top wall 188 and side walls 190 of the shroud 182 enclose the bolt 104 and the strike 106 to restrict access to these components and prevent tampering with the cover lock 102. In some aspects of the disclosure, the shroud 182 is positioned adjacent the housing assembly lock 120 to block access through the end of the shroud 182 adjacent the bolt 104 and the strike 106 of the cover lock 102.

In aspects of the disclosure, the shroud 182 includes gripping flanges 194 that extend from the top wall 188 outwardly beyond the side walls 190. The gripping flanges 196 are positioned to be grasped by an installation person during assembly of the shroud 182 to the cover lock 100.

Figure 19:
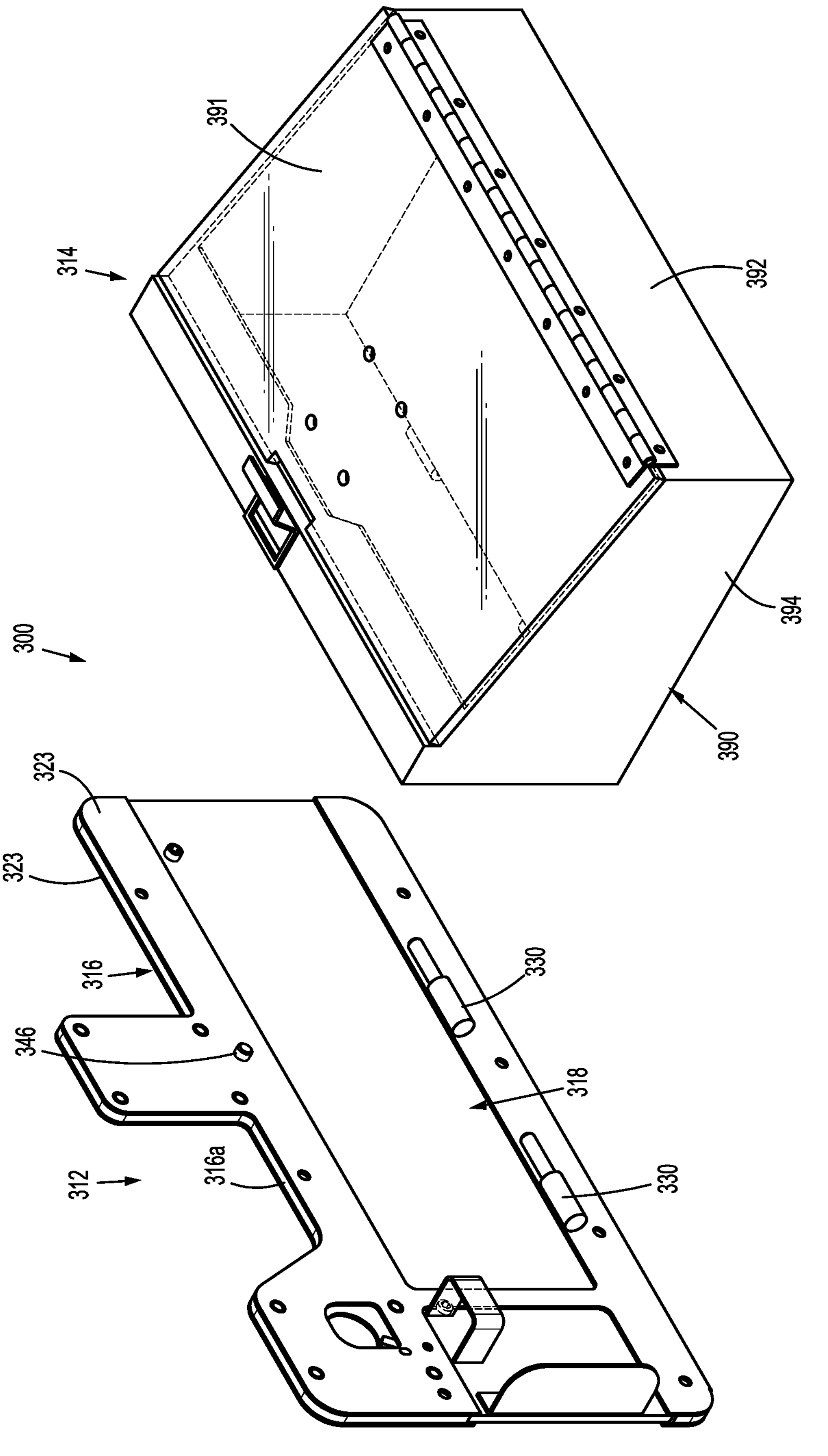
FIG. 19 is side perspective view of an alternate version of the access opening closure device shown in FIG. 1 with the slide assembly separated from the housing assembly and in the closed position.
Figure 20:
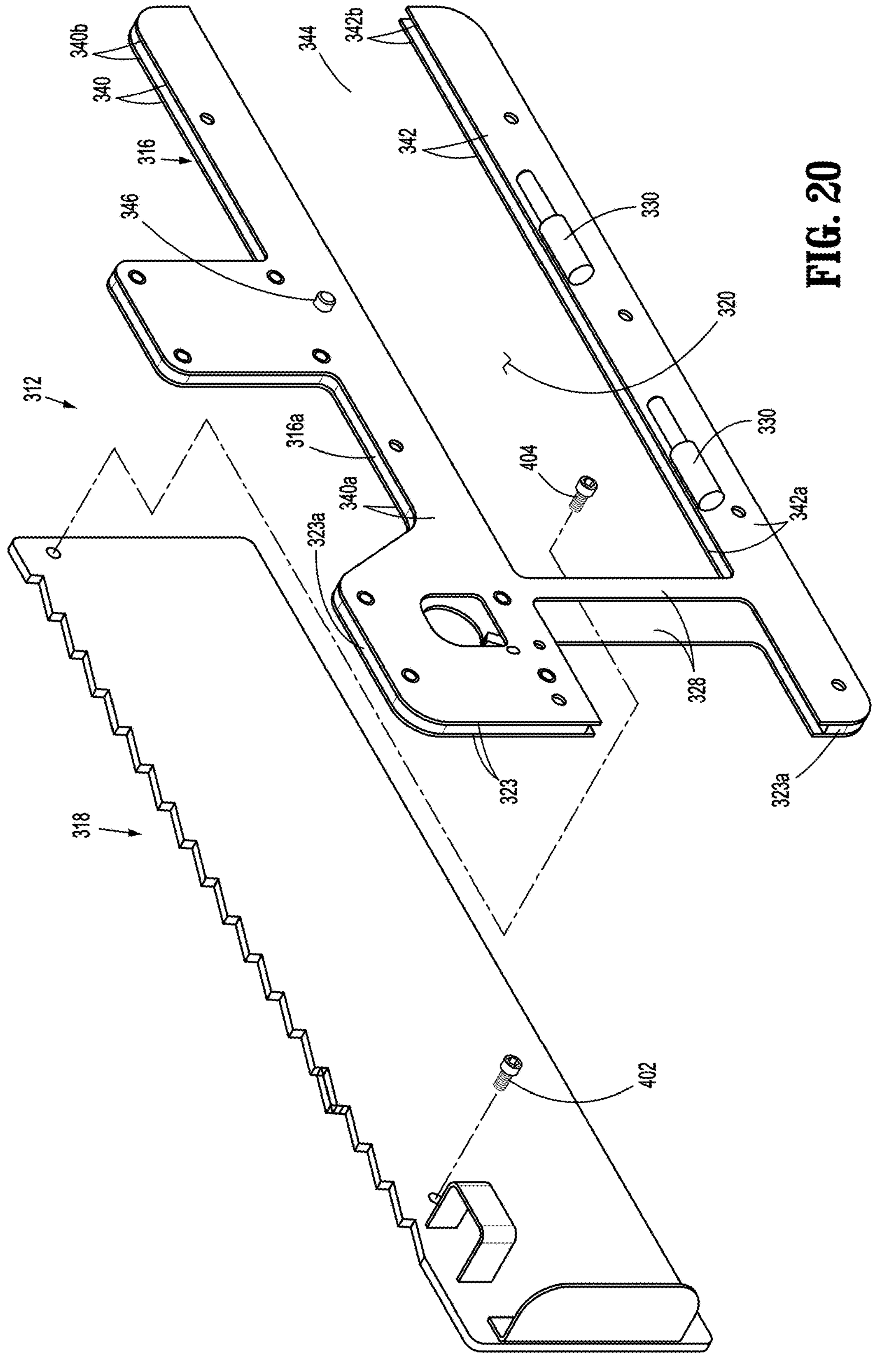
FIG. 20 is a side perspective view of the slide assembly of the access opening closure device shown in FIG. 19.
Figure 21:
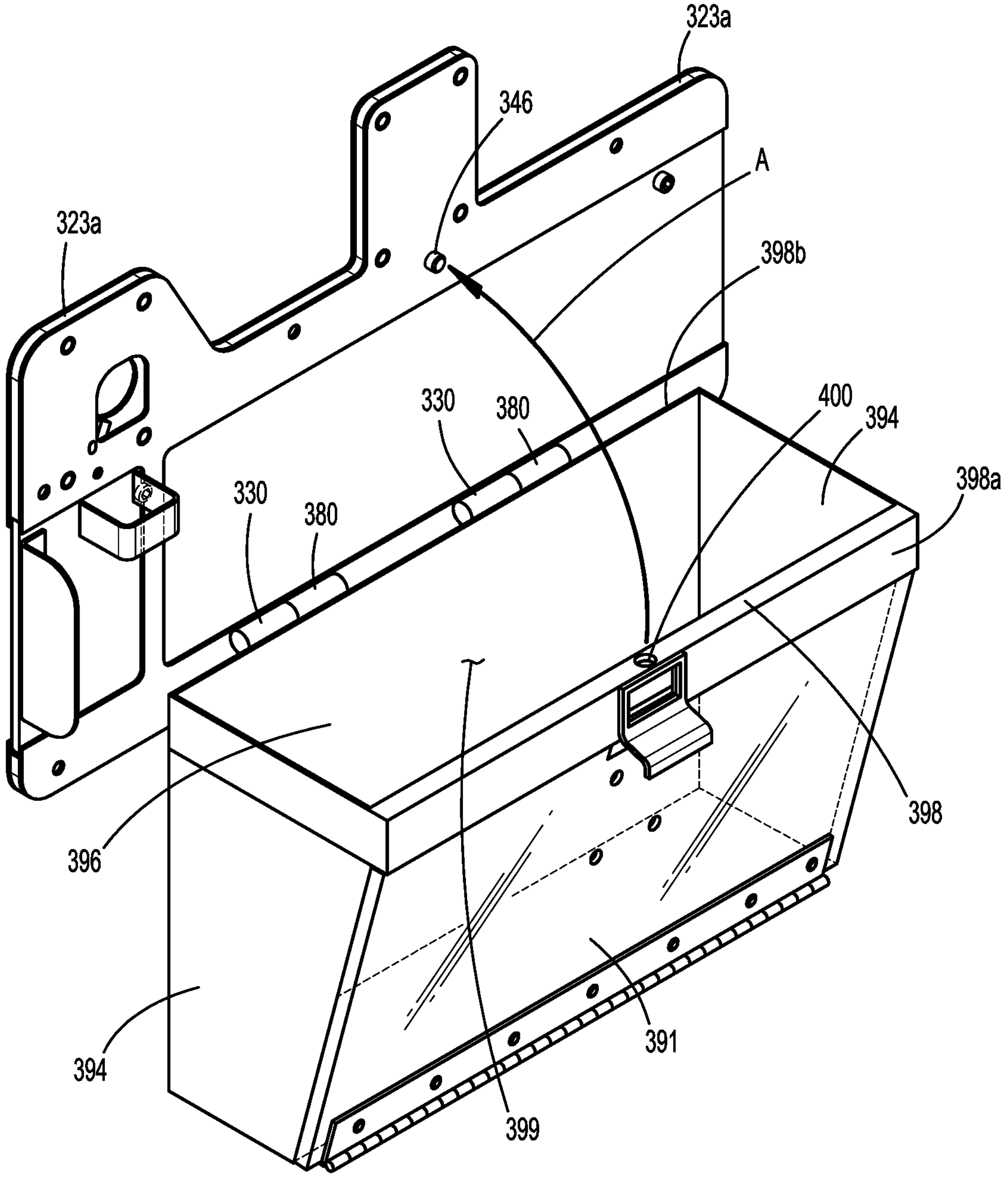
FIG. 21 is a side perspective view of the access opening closure device shown in FIG. 19 with the slide assembly pivotably coupled to the housing assembly in the stowed position.

FIGS. 19-21 illustrate an alternate version of the access opening closure device shown in FIG. 1 shown generally as access opening closure device 300. Access opening closure device 300 is similar to access opening closure device 10 (FIG. 1). As such only the differences between the access opening closure device 10 and access opening closure device 300 will be described in detail herein. Although not shown, the access opening closure device 300 is adapted to include locks 52, 102, and 120 (FIG. 1) in the manner described above in regard to the access opening closure device 10.

The access opening closure device 300 includes a slide assembly 312 and a housing assembly 314 that are removably secured together. The slide assembly 312 includes a frame 316 and an access door 318. The frame 316 defines a channel 316*a* for slidably receiving the access door 318. The frame 316 of the slide assembly 312 also defines an opening 320 (FIG. 20) which is covered by the access door 318 when the access door 318 is in a closed position (FIG. 21) and uncovered by the access door 318 when the access door 318 is moved to an open position. In aspects of the disclosure, the frame 316 and the access door 318 have rectangular configurations although other configurations are envisioned. In aspects of the disclosure, the frame 316 includes plates 323 which are separated by spacers 323*a* (FIG. 6) to define the channel 316*a* through which the access door 318 is slidable between the open and closed positions.

Each of the plates 323 of the frame 316 includes upper and lower walls 340, 342 that have first end portions 340*a*, 342*a* and second end portions 340*b*, 342*b*, and a vertical strut 328 that connects first end portions 340*a*, 342*a* of the upper and lower walls 340, 342 to each other. In contrast to the frame 16 (FIG. 2) of access opening closure device 10 (FIG. 1), the second end portions 340*b*, 342*b* of the upper and lower walls 340, 342 are spaced from each other to define an opening 344 that receives the access door 318 when the access door 318 is in its closed position. By providing an opening at the second end portion of the frame 316, the access door 318 can extend to the end of a door (not shown) to which the access opening closure device 300 is secured. It is noted that although the opening 344 is shown on the right side of the slide assembly 312, the components of the slide assembly 312 could be reversed such that the opening 344 is provided on the left side and the access door 318 slides in the opposite direction. The upper wall 340 of the plate 323 of the frame 316 also includes a stabilizing member 346 that extends towards the housing assembly 314.

In aspects of the disclosure, the housing assembly 314 includes a body 390 that defines a receptacle 390*a* and a cover 391 that is pivotably supported on the body 390 as described above regarding cover 100 (FIG. 1). The body 390 includes a front wall 392 (FIG. 19), a pair of side walls 394, a bottom wall 396, and a rear wall 398 that define the receptacle 390*a*. The rear wall 398 of the housing assembly 314 is rectangular and defines a rectangular opening 399 that communicates with the receptacle 390*a* of the housing assembly 314 when the housing assembly 314 is in its operative position. The rear wall 398 includes an upper wall portion 398*a* and a lower wall portion 398*b*. The lower wall portion 398*b* supports hinge members 330 and the upper wall portion 398*a* defines a bore 400. The bore 400 is positioned to receive the stabilizing member 346 when the housing assembly 314 is moved to its operative position in the direction of arrow "A" in FIG. 21 Receipt of the stabilizing member 346 of the frame 316 within the opening 340 of the upper wall portion 398*a* of the rear wall 398 of the housing assembly 314 restricts downward movement of the housing assembly 314 in relation to the frame 316 of the slide assembly 312 when downward pressure is applied to the housing assembly 314 with the housing assembly 314 in the operative position. Downward movement of the housing assembly 314 in relation to the slide assembly 312 may disengage the housing assembly lock 120 (FIG. 1) to allow the housing assembly 314 to be moved from its operative position to its stowed position.

Figure 22:
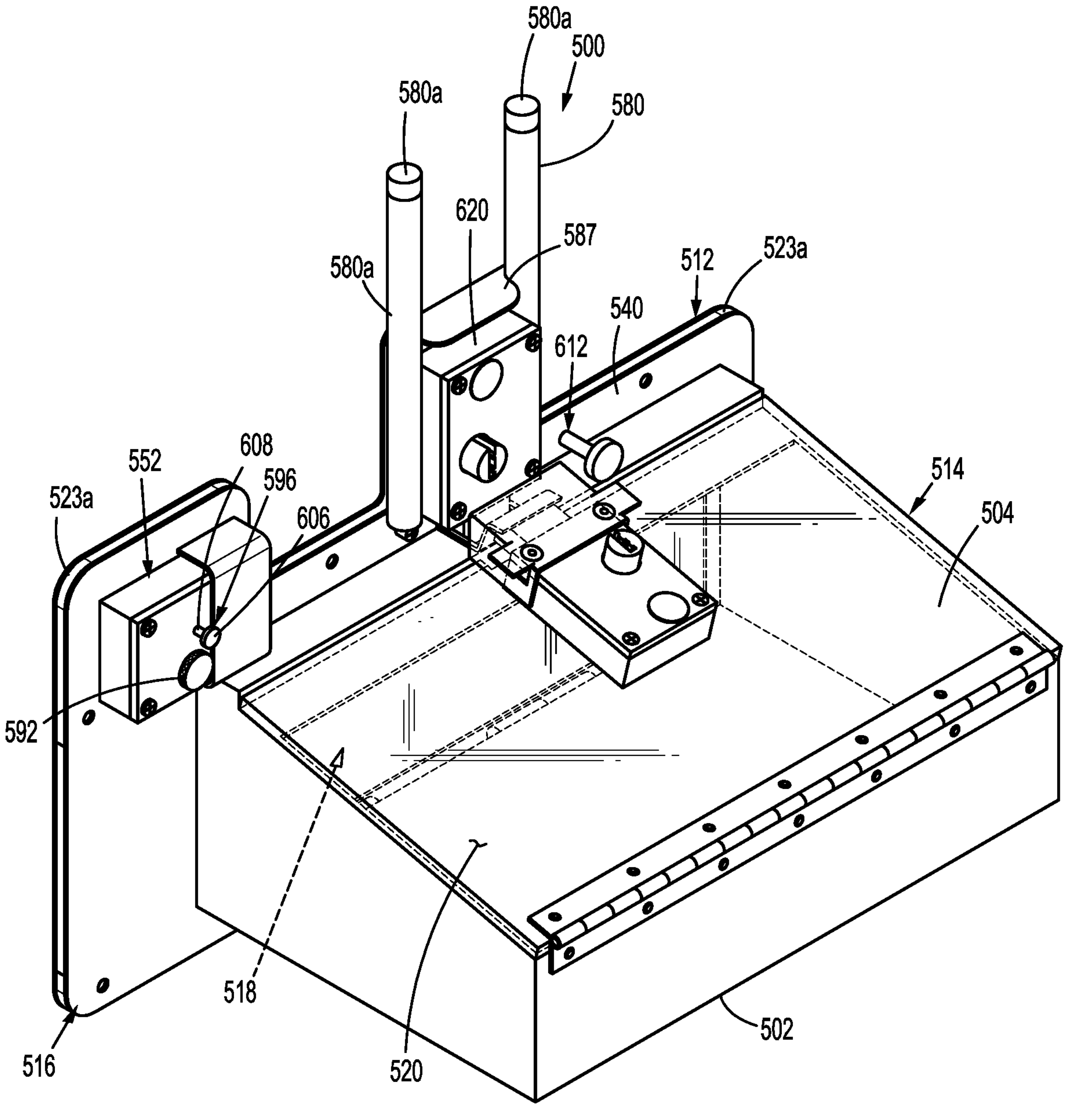
FIG. 22 is a side perspective view of another alternate version of the access opening closure device shown in FIG. 1 in the operative position with the cover and the access door in closed positions.
Figure 23:
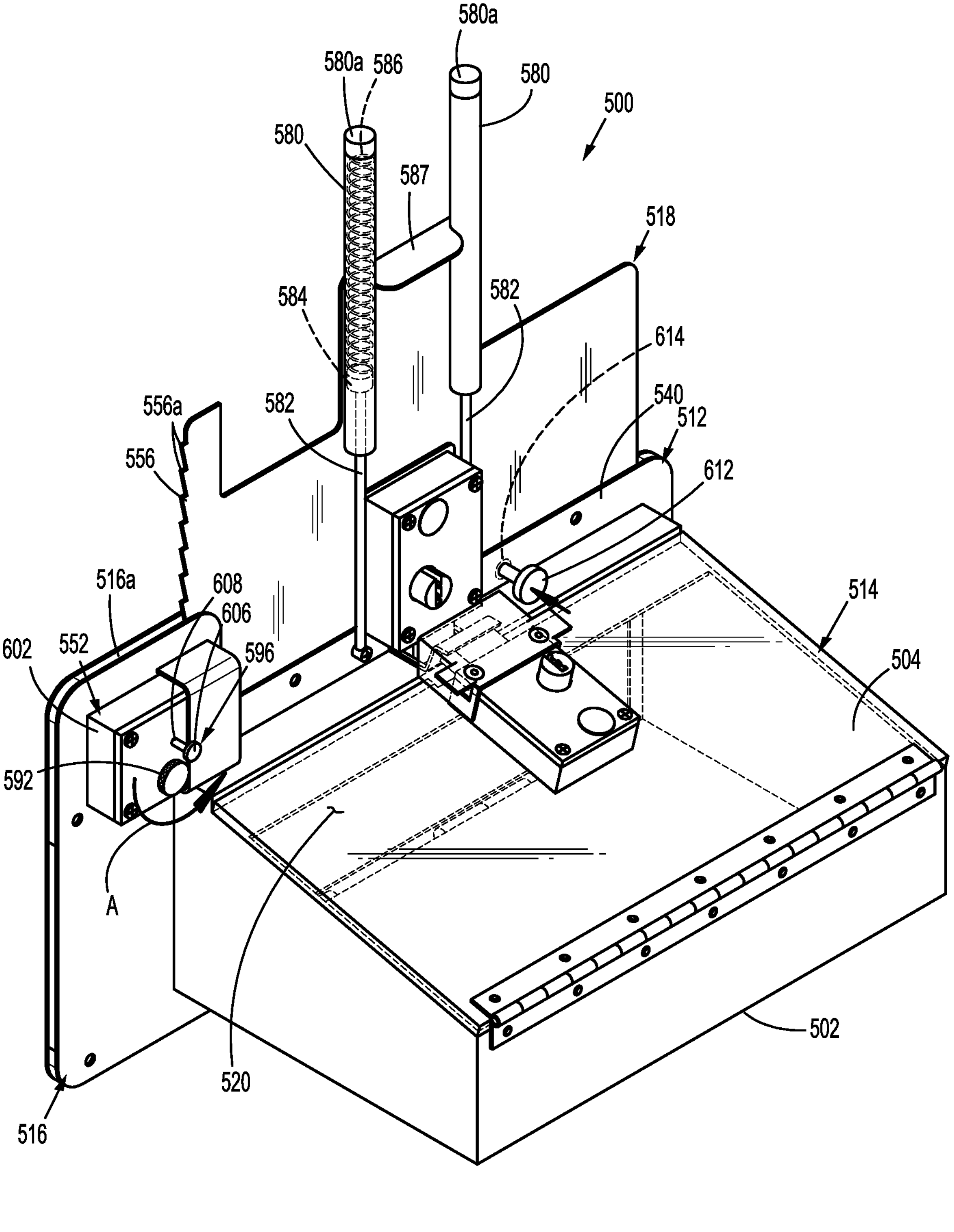
FIG. 23 is a side perspective view of the access opening closure device shown in FIG. 22 in the operative position with the cover in the closed position and the access door in the closed position.

The access door 318 supports stop members 402 and 404 that are secured to and extend outwardly of the access door 318. The stop member 402 is positioned to engage one side of the vertical strut 328 of the frame 316 of the slide assembly 312 when the access door 318 is in the closed position (FIG. 19) and the stop member 404 is positioned to engage the other side of the vertical strut 328 when the access door 318 is in the open position. As illustrated, the access door 318 is movable along a horizontal axis as it moves between its open and closed positions. It is envisioned that the access door 318 could be provided to move along a vertical axis as it moves between the open and closed positions. FIGS. 22 and 23 illustrate a vertically movable access door 518 which is described in detail below.

Although not shown, the housing assembly 314 of the access opening closure device includes hinge members that are like the hinge members 80 (FIG. 3) of the access closure device 10 that are pivotably supported on hinge members 330 of the slide assembly 312 (FIG. 2) to rotatably support the housing assembly 314 to the slide assembly 312. In addition, the access opening closure device 300 includes a housing assembly lock similar to housing assembly lock 120 (FIG. 1) to allow the housing assembly 314 to be retained in its operative position and moved to its stowed position.

FIGS. 22 and 23 illustrate another alternate version of the access opening closure device shown generally as access opening closure device 500. Access opening closure device 500 is similar to access opening disclosure devices 100 (FIG. 1) and 300 (FIG. 19) and includes a slide assembly 512 and a housing assembly 514. The housing assembly 514 is substantially similar to the housing assembly 314 and includes a body 502 and a cover 504. The housing assembly 514 will not be described in further detail herein. The slide assembly 512 includes a frame 516 and an access door 518 that is movable vertically between open and closed positions. The frame 516 includes spaced plates 523 that define a channel 516*a* for slidably receiving the access door 518. The frame 516 also defines an opening 520 (FIG. 23) which is covered by the access door 518 when the access door 518 is in a closed position (FIG. 22) and uncovered by the access door 518 when the access door 318 is in an open position (FIG. 23). In aspects of the disclosure, the plates 523 are separated by spacers 523*a* (FIG. 22) to define the channel 516*a* through which the access door 518 is slidable between the open and closed positions.

In aspects of the disclosure, the access door 518 of the slide assembly 512 includes spaced cylinders 580 that are fixedly secured to the access door 518 and the frame 516 includes two shafts 582 that are fixedly secured to the upper wall 540 of the frame 512. The spaced cylinders 580 and the shafts 582 are vertically oriented such that the access door 518 is movable vertically between its closed and open positions. The shafts 582 are received within the spaced cylinders 580 and support pistons 584. Each of the spaced cylinders 580 receives a biasing member 586 that is positioned in compression between a closed end 580*a* of the spaced cylinder 580 and the piston 584 to urge the access door 518 upwardly towards its open position. In aspects of the disclosure, the biasing member 586 includes a coil spring although the use of other types biasing members is envisioned. In some aspects of the disclosure, the access door 518 includes a handle 587 that can be gripped to move the access door between its closed and open positions.

In aspects of the disclosure, the access door 518 includes a side wall that defines a toothed rack 556 (FIG. 23) having a plurality of teeth 556*a*. Each tooth 556*a* has a triangular shape with a substantially horizontal wall and a sloped wall. The toothed rack 556 is engaged with the access door lock 552 to control movement of the access door 518 between the open and closed positions. As described below, the horizontal wall of each tooth 556*a* prevents movement of the access door 518 towards its open position, whereas the sloped wall of each tooth 556*a* facilitates movement of the access door 18 towards its closed position.

Figure 25:
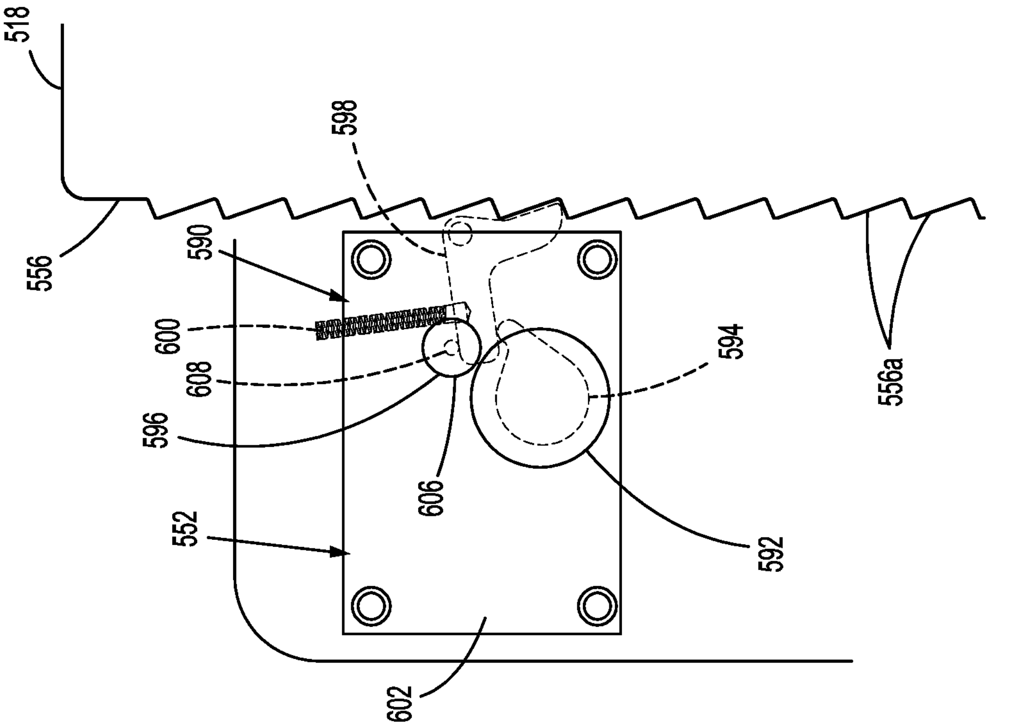
FIG. 25 is a front view shown partially in phantom of the access door lock shown in FIG. 24 with the access door lock in a locked position.
Figure 24:
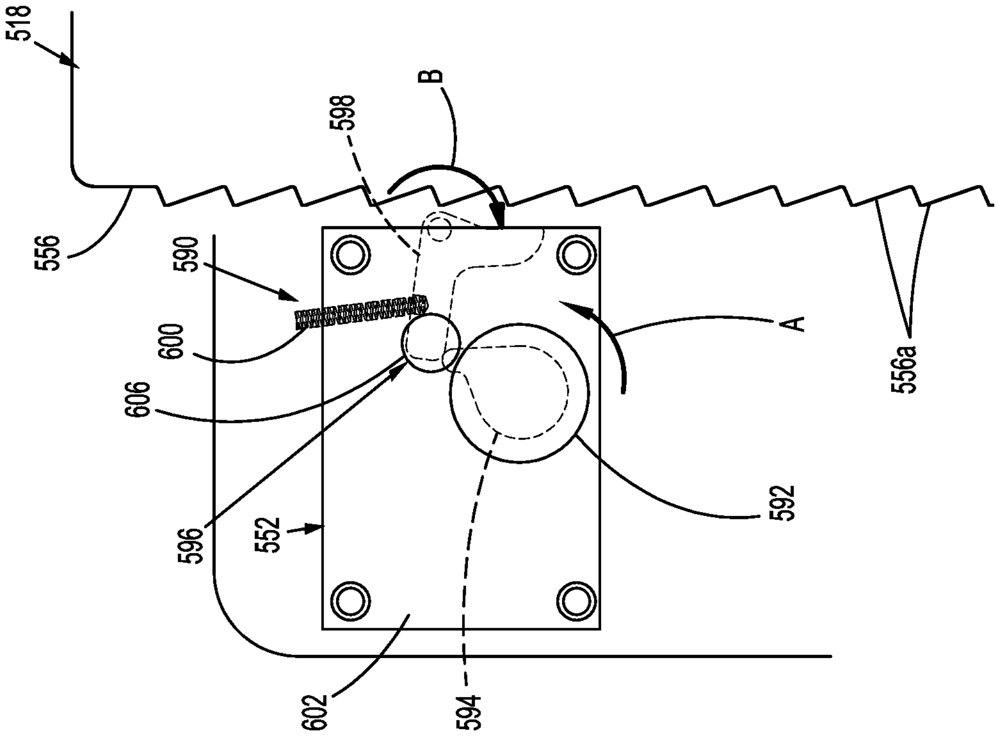
FIG. 24 is a front view shown partially in phantom of an access door lock of the access opening closure device shown in FIG. 23 with the access door lock in an unlocked position.

FIGS. 24 and 25 illustrate the access door lock 552 and the toothed rack 556 of the access door 518. The access door lock 552 includes a pawl assembly 590, an actuation knob 592, a cam member 594, and a lock member 596. The pawl assembly 590 includes a pawl member 598 and a biasing member 600. The pawl member 598 is rotatably secured to a housing 602 of the access door lock 552 and is movable from a locked position (FIG. 25) engaged with the toothed rack 556 of the access door 518 to an unlocked position (FIG. 24) disengaged from the toothed rack 556 of the access door 518. The biasing member 600 urges the pawl member 590 towards its locked position. In the locked position, the pawl member 598, via engagement with the substantially horizontal walls of the teeth 556*a* of the toothed rack 556, prevents movement of the access door 518 towards the open position, but allows movement of the access door 518 towards the closed position.

The actuation knob 592 is secured to the cam member 594 and is rotatable to rotate the cam member 594 into engagement with the pawl member 598. When the actuation knob 592 is rotated in the direction of arrow "A" in FIGS. 23 and 24, the cam member 594 is rotated into engagement with the pawl member 598 to move the pawl member 598 in the direction of arrow "B" on FIG. 24 from the locked position (FIG. 24) to the unlocked position (FIG. 25).

The lock member 596 includes a grip member 606 and a shaft 608. The lock member 596 is movable from a locked position to an unlocked position to control movement of the pawl member 594. More specifically, the shaft 608 extends into the housing 602 of the access door lock 552 and is positioned adjacent the pawl member 598. In the locked position (FIG. 25) of the lock member 596, the shaft 608 of the lock member 596 engages the pawl member 594 to prevent movement of the pawl member 598 from its locked position to its unlocked position. When the lock member 596 is in its locked position, the actuation knob 592 cannot be rotated in the direction of arrow "A" in FIG. 23. When the lock member 596 is moved to its unlocked position, the shaft 608 of the lock member 596 is moved away from the pawl member 598 to facilitate movement of the pawl member 598 to its unlocked position. In aspects of the disclosure, the lock member 596 can be a push/pull member that can be, e.g., pulled outwardly to move the lock member 596 from the locked position to the unlocked position and pushed inwardly to move the lock member 596 from the unlocked position to the locked position. In aspects of the disclosure, the lock member 596 is biased to the locked position.

In aspects of the disclosure, the frame 516 of the slide assembly 512 includes a plunger 612 (FIG. 23) and the access door 516 defines an opening 614 (shown in phantom in FIG. 23. When the access door 516 is in its open position, the plunger 612 can be pressed inwardly into the opening 614 to retain the access door 516 in the open position.

The access opening closure device 500 includes a housing assembly lock 620 (FIG. 1) that functions like housing assembly lock 120 described above to allow the housing assembly 514 to be retained in its operative position to moved to its stowed position.

Although not shown, the housing assembly 514 includes hinge members that are like the hinge members 80 (FIG. 3) of the access closure device 10 that are pivotably supported on hinge members on the slide assembly 512 like the hinge members 30 (FIG. 3) of slide assembly 12 (FIG. 2) to rotatably support the housing assembly 514 to the slide assembly 512. It is also noted that although not shown in detail in FIGS. 22 and 23, the frame 516 of the slide assembly 512 includes a stabilizing member 346 (FIG. 20) and the housing assembly 514 defines a bore 400 (FIG. 21) that receives the stabilizing member 346 to provide added stability to the housing assembly 514 when the housing assembly 514 is in the operative position.

Persons skilled in the art will understand that the devices and methods specifically described herein and illustrated in the accompanying drawings are non-limiting exemplary aspects of the disclosure. It is envisioned that the elements and features illustrated or described in connection with one exemplary embodiment may be combined with the elements and features of another without departing from the scope of the disclosure. As well, one skilled in the art will appreciate further features and advantages of the disclosure based on the above-described aspects of the disclosure. Accordingly, the disclosure is not to be limited by what has been particularly shown and described, except as indicated by the appended claims.

What is claimed is:

1. An access opening closure device comprising:

a housing assembly having a body defining a receptacle, a first opening, a second opening, and a bore;

a slide assembly including a frame and an access door, the frame including a stabilizing member and defining a frame opening, the access door supported on the frame and movable between a closed position covering the frame opening and an open position uncovering the frame opening, the housing assembly pivotably supported on the frame of the slide assembly between a non-operative position in which the first opening of the body of the housing assembly is pivoted away from the frame opening in the frame of the slide assembly and an operative position in which the first opening of the body of the housing assembly is aligned with the frame opening in the frame of the slide assembly;

a housing assembly lock supported on the frame of the slide assembly, the housing assembly lock configured to retain the housing assembly in the operative position and operable to allow the housing assembly to be pivoted to the non-operative position;

wherein the stabilizing member of the frame is received within the bore of the housing assembly when the housing assembly is in the operative position to restrict downward movement of the housing assembly in relation to the frame of the slide assembly when downward pressure is applied to the housing assembly with the housing assembly in the operative position.

2. The access opening closure device of claim 1, further including a cover supported on the body of the housing assembly, the cover movable from a closed position covering the second opening of the body to an open position uncovering the second opening of the body.

3. The access opening closure device of claim 2, further including a cover lock supported on the cover, the cover lock configured to retain the cover in its closed position and operable to facilitate movement of the cover from its closed position to its open position.

4. The access opening closure device of claim 3, further including a shroud, wherein the cover lock includes a bolt and a strike, and the shroud is secured to the cover to obstruct access to the bolt and the strike.

5. The access opening closure device of claim 4, wherein the shroud includes gripping flanges that facilitate placement of the shroud onto the cover.

6. The access opening closure device of claim 1, wherein the access door of the slide assembly includes first and second vertically oriented cylinders and the frame of the slide assembly includes first and second vertically oriented shafts, each of the first and second shafts supporting a piston, the pistons received within the first and second cylinders such that the access door is movable vertically between its open and closed positions.

7. The access opening closure device of claim 6, further including a biasing member positioned within each of the first and second cylinders, and wherein each of the biasing members is positioned between a closed end of the respective first or second cylinder and the respective piston, the biasing members positioned to urge the access door towards the open position.

8. The access opening closure device of claim 7, wherein the biasing members include coil springs.

9. The access opening closure device of claim 6, wherein the access door includes a side wall that has a toothed rack, and the frame of the slide assembly supports an access door lock, the access door lock movable from a locked position engaged with the toothed rack to an unlocked position disengaged from the toothed rack.

10. The access opening closure device of claim 9, wherein the access door lock includes a pawl member, an actuation knob, and a cam member, the actuation knob secured to the cam member and being movable to move the cam member into engagement with the pawl member to move the pawl member from a first position engaged with the toothed rack to a second position disengaged from the toothed rack, the pawl member engaged with the toothed rack in the locked position of the access door lock and disengaged from the toothed rack in the unlocked position of the access door lock.

11. The access opening closure device of claim 10, wherein the access door lock includes a lock member, the lock member movable from a first position engaged with the pawl member to prevent movement of the pawl member from its first position to its second position to a second position spaced from the pawl member to allow movement of the pawl member from its first position to its second position.

12. The access opening closure device of claim 6, wherein the slide assembly includes a plunger that is supported on the frame, and the access door defines a plunger opening, the plunger opening aligned with and receiving the plunger when the access door is in the open position to retain the access door in its open position.

13. An access opening closure device comprising:

a housing assembly having a body defining a receptacle, a first opening, a second opening, and a bore;

a slide assembly including a frame and an access door, the frame including a stabilizing member and defining a frame opening, the access door supported on the frame and movable between a closed position covering the frame opening and an open position uncovering the frame opening, the housing assembly pivotably supported on the frame of the slide assembly between a non-operative position in which the first opening of the body of the housing assembly is pivoted away from the frame opening in the frame of the slide assembly and an operative position in which the first opening of the body of the housing assembly is aligned with the frame opening in the frame of the slide assembly;

wherein the stabilizing member of the frame is received within the bore of the housing assembly when the housing assembly is in the operative position, and wherein the frame of the slide assembly includes an upper wall, a lower wall, and a vertical strut, the upper and lower walls each having first and second end portions, the first end portions of the upper and lower walls coupled together by the vertical strut, the second end portions of the upper and lower walls being spaced from each other to define an opening that receives the access door when the access door is in its closed position.

14. The access opening closure device according to claim 13, further including first and second stop members supported on the access door, the first stop member engaging a first side of the vertical strut when the access door is in its open position and the second stop member engaging a second side of the vertical strut when the access door is in its closed position.

15. An access opening closure device comprising:

a housing assembly having a body defining a receptacle, a first opening, and a second opening, a cover supported on the body of the housing assembly, the cover movable from a closed position covering the second opening of the body to an open position uncovering the second opening of the body;

a cover lock supported on the cover of the housing assembly, the cover lock including a bolt and a strike, the cover lock configured to retain the cover in its closed position and operable to facilitate movement of the cover from its closed position to its open position;

a shroud secured to the cover to obstruct access to the bolt and the strike of the cover lock, the shroud including a top wall and side walls that enclose the bolt and the strike; and a slide assembly including a frame and an access door, the frame defining a frame opening, the access door supported on the frame and movable between a closed position covering the frame opening and an open position uncovering the frame opening, the housing assembly pivotably supported on the frame of the slide assembly between a non-operative position in which the first opening of the body of the housing assembly is pivoted away from the frame opening in the frame of the slide assembly and an operative position in which the first opening of the body of the housing assembly is aligned with the frame opening in the frame of the slide assembly, wherein the shroud includes gripping flanges that facilitate placement of the shroud onto the cover, the gripping flanges extending from the top wall outwardly beyond the side walls.

* * * * *